(12) United States Patent
Kishida

(10) Patent No.: US 7,796,571 B2
(45) Date of Patent: Sep. 14, 2010

(54) COMMUNICATION SYSTEM, COMMUNICATION CONTROL APPARATUS AND COMMUNICATION TERMINAL APPARATUS

(75) Inventor: Hiroyuki Kishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1729 days.

(21) Appl. No.: 10/369,583

(22) Filed: Feb. 21, 2003

(65) Prior Publication Data

US 2003/0219002 A1 Nov. 27, 2003

(30) Foreign Application Priority Data

Feb. 22, 2002 (JP) ............................ P2002-046897

(51) Int. Cl.
*H04W 4/00* (2009.01)
(52) U.S. Cl. .................... 370/338; 370/445; 455/63.1; 455/450
(58) Field of Classification Search ........................ None
See application file for complete search history.

(56) References Cited

U.S. PATENT DOCUMENTS

| | | | |
|---|---|---|---|
| 6,928,266 B1 * | 8/2005 | Nevo et al. ................. | 455/63.3 |
| 7,158,759 B2 * | 1/2007 | Hansen et al. ............ | 455/67.11 |
| 2001/0053139 A1 * | 12/2001 | Zimmermann et al. ...... | 370/332 |
| 2002/0052201 A1 * | 5/2002 | Wilhelmsson et al. ....... | 455/434 |
| 2002/0136184 A1 * | 9/2002 | Liang et al. ................. | 370/338 |
| 2002/0155811 A1 * | 10/2002 | Prismantas et al. ........... | 455/63 |
| 2003/0054827 A1 * | 3/2003 | Schmidl et al. ............. | 455/450 |
| 2004/0246929 A1 * | 12/2004 | Beasley et al. .............. | 370/335 |

FOREIGN PATENT DOCUMENTS

| | | |
|---|---|---|
| EP | 1 111 843 A2 | 6/2001 |
| JP | 2-86246 U | 7/1990 |
| JP | 6-125306 A | 5/1994 |
| JP | 2001-218252 A | 8/2001 |

* cited by examiner

*Primary Examiner*—Michael J Moore, Jr.
(74) *Attorney, Agent, or Firm*—Birch, Stewart, Kolasch & Birch, LLP

(57) ABSTRACT

A slave apparatus control portion refers to a priority channel table stored in a use priority channel memory at the time of establishing communications with a host apparatus. The radio channel having the highest priority is allocated as the initial channel, and a connection request signal is transmitted from a communicating portion to the host apparatus in the frequency band of the initial channel. When the initial channel interferes with the radio channels used by other slave apparatuses or the frequency bands used by PCs, the radio channel overlapping those frequency bands is avoided, and the radio channel of the frequency band that is the second highest priority is selected.

23 Claims, 21 Drawing Sheets

FIG. 3

| CHANNEL NO. | LOWEST FREQUENCY (MHz) | CENTER FREQUENCY (MHz) | HIGHEST FREQUENCY (MHz) |
|---|---|---|---|
| 1 | 2401 | 2412 | 2423 |
| 2 | 2406 | 2417 | 2428 |
| 3 | 2411 | 2422 | 2433 |
| 4 | 2416 | 2427 | 2438 |
| 5 | 2421 | 2432 | 2443 |
| 6 | 2426 | 2437 | 2448 |
| 7 | 2431 | 2442 | 2453 |
| 8 | 2436 | 2447 | 2458 |
| 9 | 2441 | 2452 | 2463 |
| 10 | 2446 | 2457 | 2468 |
| 11 | 2451 | 2462 | 2473 |
| 12 | 2456 | 2467 | 2478 |
| 13 | 2461 | 2472 | 2483 |
| 14 | 2473 | 2484 | 2495 |

FIG. 4

| No. | CENTER FREQUENCY (MHz) | No. | CENTER FREQUENCY (MHz) | No. | CENTER FREQUENCY (MHz) |
|---|---|---|---|---|---|
| 1 | 2400 | 16 | 2430 | 31 | 2460 |
| 2 | 2402 | 17 | 2432 | 32 | 2462 |
| 3 | 2404 | 18 | 2434 | 33 | 2464 |
| 4 | 2406 | 19 | 2436 | 34 | 2466 |
| 5 | 2408 | 20 | 2438 | 35 | 2468 |
| 6 | 2410 | 21 | 2440 | 36 | 2470 |
| 7 | 2412 | 22 | 2442 | 37 | 2472 |
| 8 | 2414 | 23 | 2444 | 38 | 2474 |
| 9 | 2416 | 24 | 2446 | 39 | 2476 |
| 10 | 2418 | 25 | 2448 | 40 | 2478 |
| 11 | 2420 | 26 | 2450 | | |
| 12 | 2422 | 27 | 2452 | | |
| 13 | 2424 | 28 | 2454 | | |
| 14 | 2426 | 29 | 2456 | | |
| 15 | 2428 | 30 | 2458 | | |

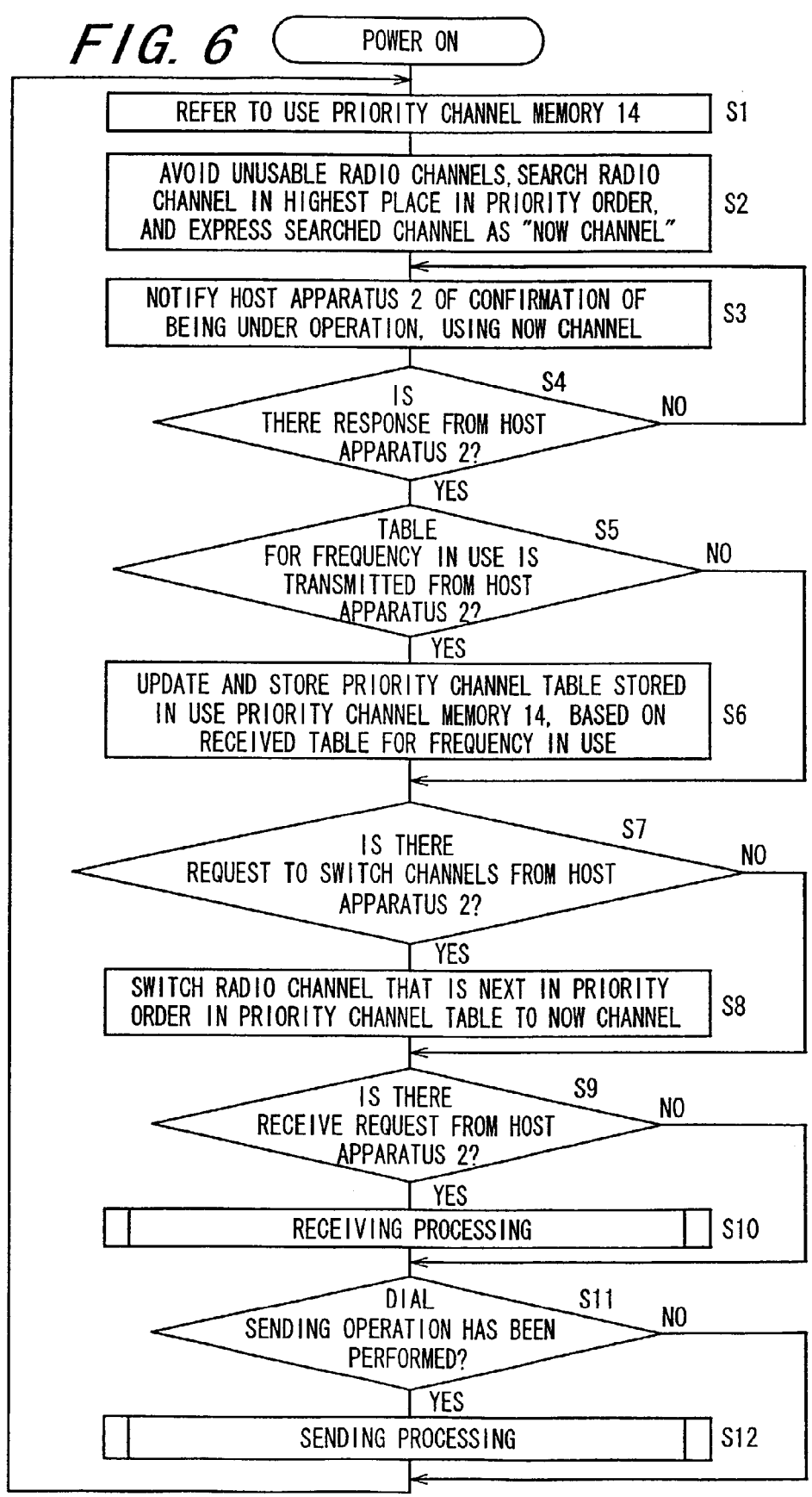

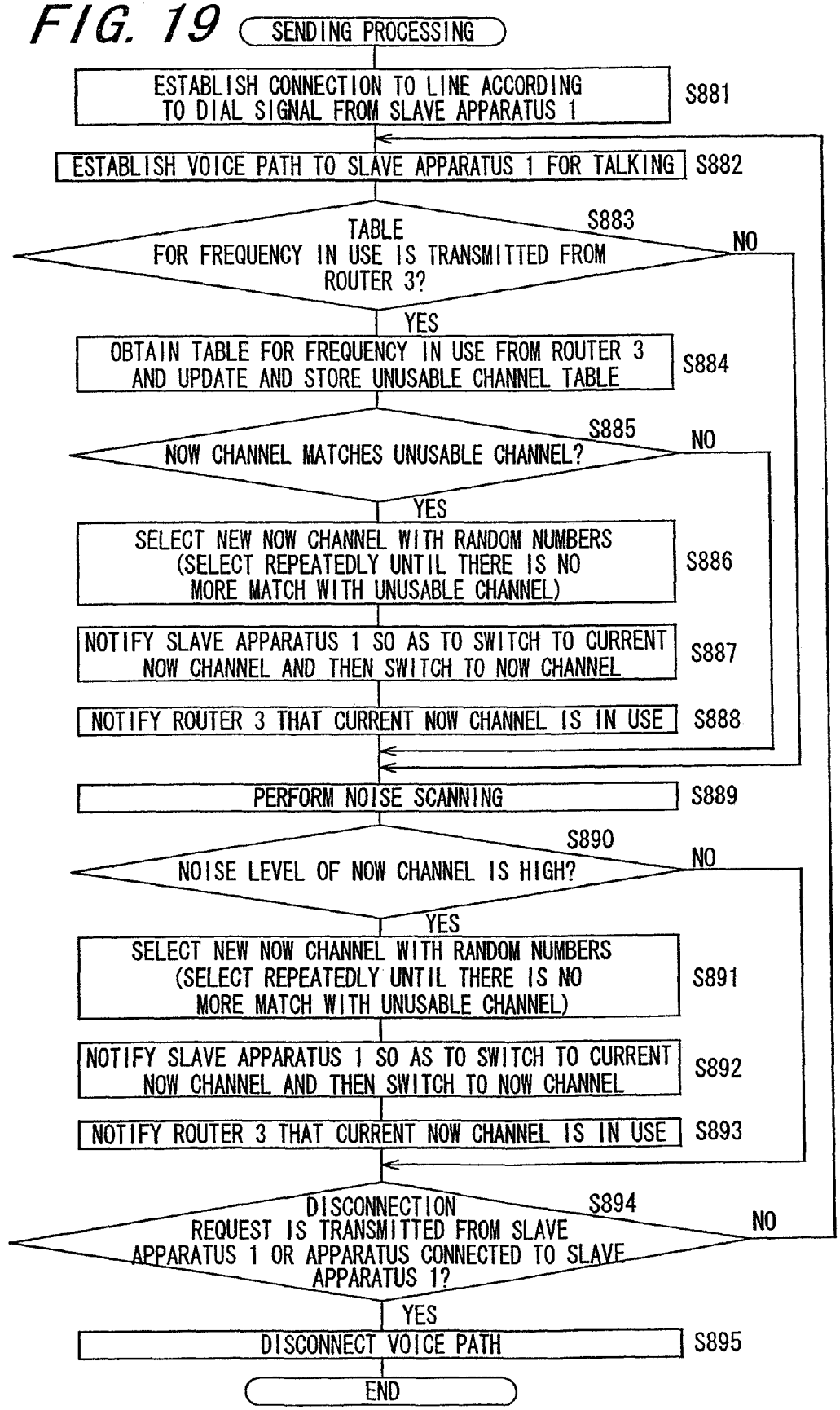

COMMUNICATION SYSTEM, COMMUNICATION CONTROL APPARATUS AND COMMUNICATION TERMINAL APPARATUS

BACKGROUND OF THE INVENTION

1. Field of the Invention

The present invention relates to a communication system for communicating with a communication terminal apparatus on an external network. More specifically, the invention relates to a communication system constituted by communication terminal apparatuses having a radio communication function.

2. Description of the Related Art

In recent years, an inhouse network in which communication terminal apparatuses such as cordless telephone apparatuses, facsimiles provided with a radio communication function and personal computers are mutually connected via wired or wireless communication paths is formed in workplaces such as offices and individual houses such as apartments. Thus, there is an increasing tendency that a plurality of communication terminal apparatuses are used at the same time.

The communication terminal apparatuses on an inhouse network are connected to an external network such as the Internet so as to communicate with communication terminal apparatuses on the external network to exchange data. When connected to the external network, a router that selects an optimal communication path to a communication terminal apparatus to be communicated with and relays data thereto is provided in the inhouse network.

When a noise source is present near a cordless telephone apparatus or a router, noise waves may be received at a radio communication portion provided in the cordless telephone apparatus, or the noise waves received by the router may be transmitted to the cordless telephone apparatus. Therefore, the noise waves interfere with the radio channel used for the radio communications between the host apparatus and the slave apparatus of the cordless telephone apparatus, and thus hopping (switching of the radio channel) occurs frequently. Since malfunction such as mute occurs at the time of hopping, the communication quality is degraded.

An example of conventional techniques to solve this problem is the cordless telephone apparatus disclosed in Japanese Unexamined Utility Publication JP-U 2-86246 (1990), where a host apparatus includes detecting means for performing a channel search upon power-on to detect an unused channel and indicating means for indicating that an unused channel has been detected. Thus, when providing the host apparatus near an information processor causing noise, the host apparatus can be provided in an optimal position that does not allow the host apparatus to be affected by noise by providing the host apparatus according to the indicating means.

However, the above-described cordless telephone apparatus requires a time for searching for an unused channel every time power is on, and therefore extra time is needed. In addition, since the influence of the radio waves emitted by the cordless telephone itself is not considered, interference occurs between the radio waves emitted by the cordless telephone itself and the radio channels of other communication terminals.

On the other hand, the method for reserving a communication channel disclosed in Japanese Unexamined Patent Publication JP-A 6-125306 (1994) is as follows. A plurality of terminals (host apparatuses) connected to a main apparatus are connected radially or in the form of a chain, and each of the terminals includes a wireless apparatus that communicates with a slave apparatus. The terminal performs carrier sense, and when there is an unused communication channel, the terminal reserves the number of that communication channel at the main apparatus. On the other hand, the main apparatus searches the reservation situation of other terminals, and notifies all the terminals of possibility or impossibility of reservation thereof and keeps track of the communication status between the terminals and slave apparatuses. Thus, a communication channel can be obtained swiftly without using the overlapped radio communication channel transmitted from the terminals, which are host apparatuses, or slave apparatuses.

The system for adjusting radio networks disclosed in Japanese Unexamined Patent Publication JP-A 2001-218252 (2001) is as follows. Each radio network includes at least one modem and at least one wireless terminal, and a resource managing apparatus monitors the RF (Radio Frequency) environment of at least one of the modems and generates an RF environment report. The system determines an RF adjustment strategy based on the RF environment report and instructs at least one modem how to use the network resources, based on the RF adjustment strategy. Thus, the RF resources in the RF environment are distributed dynamically and efficiently between a multiple of radio networks located in the same RF environment, so that interference can be minimized.

In the method for reserving a communication channel disclosed in JP-A 6-125306, the interference of channels occurs and the efficiency of the radio communications of the system decreases while the host apparatus is obtaining a communication channel that can be reserved. In the system disclosed in JP-A 2001-218252, the interference of channels occurs and the efficiency of the radio communications of the system decreases while the resource managing apparatus is adjusting the RF environment in which interference does not occur.

For example, when a cordless telephone apparatus and a wireless LAN (IEEE802.11b) that use the 2.4 GHz band are present in the same environment, hopping occurs in the cordless telephone because of the influence of the wireless LAN, and the communication efficiency in the wireless LAN decreases because of the influence of the cordless telephone apparatus. The same occurs when the 5 GHz band is used, and these disadvantages do not depend on the specification or the frequency band.

The 2.4 GHz band is open as the band to be used in a large number of the standards for radio communications such as the standards for wireless LAN, Bluetooth, communications between cordless telephone apparatuses, MSS (Mobile Satellite Service), and communications of amateur radio stations under IEEE and RF Spectrum Plan (radio frequency allocation plan). The frequency of radio waves radiated from a microwave oven is in the 2.4 GHz band. Therefore, it is necessary to avoid interference or collision of radio waves carefully in order to improve the communication efficiency of radio communications in the 2.4 GHz band.

FIG. 3 is a table showing an example of radio channels in the 2.4 GHz band used in a wireless LAN. As shown in FIG. 3, in Japan, 14 radio channels are allocated for radio communications under the IEEE standard 802.11b. When a plurality of channels are used in the same environment, it is necessary to use the channels apart from each other by five channels. For example, channel No. 1 uses the band ranging from 11 MHz higher than 2412 MHz to 11 MHz lower than 2412 MHz, that is, the band of 2401 MHz to 2423 MHz. Similarly, channel No. 2 uses the band having 2417 MHz as the center, ranging from 2406 MHz to 2428 MHz. That is to say, when the channels Nos. 1 and 2 are used at the same time, a high frequency portion of the channel No. 1 and a low frequency portion of the channel No. 2 are overlapped and interfere with each other, and therefore it is necessary to use the channels apart from each other by five channels.

Furthermore, when using a radio channel of a cordless telephone apparatus in the frequency band under the IEEE 802.11b, the radio waves radiated from a microwave oven and the radio channels used in amateur radio stations, MSS or the like are included in this frequency band, so that it is necessary to avoid their frequency bands.

SUMMARY OF THE INVENTION

It is an object of the invention to provide a communication system, a communication control apparatus and a communication terminal apparatus that can perform radio communications in which a plurality of communication terminal apparatuses using the same band without interference with each other.

The invention provides a communication system comprising a communication control apparatus connected to an external network for controlling a communication path with the external network; and a plurality of communication terminal apparatuses that perform radio communications with the communication control apparatus, using any one of a plurality of radio channels by a communication method for communication under a predetermined protocol so as to communicate with the external network via the communication control apparatus, wherein the plurality of communication terminal apparatuses are grouped by each communication method under a different protocol, and a radio channel used in a communication method of each group overlaps a radio channel used in a communication method of at least one of the other groups, the communication system comprising channel detecting means for detecting a radio channel currently used by a communication terminal apparatus communicating with the communication control apparatus, and radio communication control means for controlling communications by selecting a radio channel other than the currently used radio channel, based on results of detection by the channel detecting means, at least when establishing communications between a communication terminal apparatus that is not communicating and the communication control apparatus and when switching a radio channel used for communications established between a communication terminal apparatus and the communication control apparatus.

According to the invention, a communication control apparatus connected to an external network for controlling a communication path with the external network and a plurality of communication terminal apparatuses perform radio communications with each other, using either one of a plurality of radio channels by a communication method for communication under a predetermined protocol. The communication terminal apparatus communicates with the external network via the communication control apparatus. The plurality of communication terminal apparatuses are grouped by each communication method under a different protocol, and a radio channel used in a communication method of each group overlaps a radio channel used in a communication method of at least one of the other groups.

Since a radio channel currently used by a communication terminal apparatus communicating with the communication control apparatus is detected by the channel detecting means, a radio channel other than the currently used radio channel is selected for communications by using results of detection by the channel detecting means, at least when establishing communications between a communication terminal apparatus that is not communicating and the communication control apparatus and when switching a radio channel used for communications established between a communication terminal apparatus and the communication control apparatus. Thus, interference between radio channels of radio communications that use a plurality of different communication methods at the same time can be prevented, and the communication speed and the communication speech quality can be improved.

Furthermore, the invention provides a communication system comprising a communication control apparatus connected to an external network for controlling a communication path with the external network; a first communication terminal apparatus that performs radio communications with the communication control apparatus, using one of a plurality of radio channels by a first communication method for communication under a first protocol so as to communicate with the external network via the communication control apparatus; and a second communication terminal apparatus that performs radio communications with the communication control apparatus, using any one of a plurality of radio channels including a radio channel overlapping the radio channel used by the first communication method, by a second communication method for communication under a second protocol that is different from the first protocol so as to communicate with the external network via the communication control apparatus, the communication system comprising channel detecting means for detecting a radio channel currently used by a communication terminal apparatus communicating with the communication control apparatus, and radio communication control means for controlling communications by selecting a radio channel other than the currently used radio channel, based on results of detection by the channel detecting means, at least when establishing communications between a communication terminal apparatus that is not communicating and the communication control apparatus and when switching a radio channel used for communications established between a communication terminal apparatus and the communication control apparatus.

According to the invention, a communication control apparatus connected to an external network for controlling a communication path with the external network and the first communication terminal apparatus perform radio communications with each other, using one of a plurality of radio channels by a first communication method for communication under a first protocol. The first communication terminal apparatus communicates with the external network via the communication control apparatus. The communication control apparatus and the second communication terminal apparatus perform radio communications with each other, using one of a plurality of radio channels including a radio channel overlapping the radio channel used by the first communication method, by a second communication method for communication under a second protocol that is different from the first protocol. The second communication terminal apparatus communicates with the external network via the communication control apparatus.

Since a radio channel currently used by a communication terminal apparatus communicating with the communication control apparatus is detected by the channel detecting means, a radio channel other than the currently used radio channel can be selected for communications, based on the results of the detection by the channel detecting means, at least when establishing communications between a communication terminal apparatus that is not communicating and the communication control apparatus and when switching a radio channel used for communications established between a communication terminal apparatus and the communication control apparatus. Thus, interference between radio channels of radio communications using two different communication methods at the same time can be prevented, and the communication speed and the communication speech quality can be improved.

Furthermore, in the invention it is preferable that the frequency band of the radio channel used in the first communication method is different from the frequency band of the radio channel used in the second communication method.

According to the invention, in the radio communications using two communications methods at the same time that use radio channels having different frequency bands from each other, interference between the radio channels can be prevented.

Furthermore, in the invention it is preferable that the channel detecting means is provided in the communication control apparatus.

According to the invention, since the channel detecting means is provided in the communication control apparatus connected to all the communication terminal apparatuses, the detection efficiency can be improved.

Furthermore, in the invention it is preferable that the radio communication control means is provided in at least one of the communication control apparatus and the communication terminal apparatus.

According to the invention, since the radio communication control means is provided in at least either the communication control apparatus or the communication terminal apparatus, either apparatus can control the radio communications.

In the invention it is preferable that the communication system comprises frequency detecting means for detecting the frequency of received radio waves and in that the radio communication control means sets a radio channel including the frequency detected by the frequency detecting means to be the currently used radio channel.

According to the invention, since a radio channel including the frequency of the radio waves detected by the frequency detecting means is set to be the currently used radio channel, interference by noise waves emitted by electronic apparatuses around the communication system such as a microwave oven can be prevented.

Furthermore, in the invention it is preferable that the frequency detecting means is provided in at least one of the communication control apparatus and the communication terminal apparatus.

According to the invention, since the frequency detecting means is provided in at least either the communication control apparatus or the communication terminal apparatus, the detection efficiency of noise waves can be improved.

Furthermore, the invention provides a communication control apparatus included in a communication system comprising the communication control apparatus connected to an external network for controlling a communication path with the external network; and a plurality of communication terminal apparatuses that perform radio communications with the communication control apparatus, using either one of a plurality of radio channels by a communication method for communication under a predetermined protocol so as to communicate with the external network via the communication control apparatus, wherein the plurality of communication terminal apparatuses are grouped by each communication method under a different protocol, and a radio channel used in a communication method of each group overlaps a radio channel used in a communication method of at least one of the other groups, the communication control apparatus comprising channel detecting means for detecting a radio channel currently used by a communication terminal apparatus communicating with the communication control apparatus, and radio communication control means for controlling communications by selecting a radio channel other than the currently used radio channel, based on results of detection by the channel detecting means, at least when establishing communications between a communication terminal apparatus that is not communicating and the communication control apparatus and when switching a radio channel used for communications established between a communication terminal apparatus and the communication control apparatus.

According to the invention, a communication control apparatus connected to an external network for controlling a communication path with the external network and a plurality of communication terminal apparatuses perform radio communications with each other, using either one of a plurality of radio channels by a communication method for communication under a predetermined protocol. The communication terminal apparatus communicates with the external network via the communication control apparatus. The plurality of communication terminal apparatuses are grouped by each communication method under a different protocol, and a radio channel used in a communication method of each group overlaps a radio channel used in a communication method of at least one of the other groups.

Since a radio channel currently used by a communication terminal apparatus communicating with the communication control apparatus is detected by the channel detecting means, a radio channel other than the currently used radio channel is selected for communications by using the results of detection by the channel detecting means, at least when establishing communications between a communication terminal apparatus that is not communicating and the communication control apparatus and when switching a radio channel used for communications established between a communication terminal apparatus and the communication control apparatus. Thus, interference between radio channels of radio communications that use a plurality of different communication methods at the same time can be prevented, and the communication speed and the communication speech quality can be improved.

In the invention, it is preferable that the communication control apparatus comprises frequency detecting means for detecting the frequency of received radio waves and in that the radio communication control means sets a radio channel including the frequency detected by the frequency detecting means to be the currently used radio channel.

According to the invention, since a radio channel including the frequency of the radio waves detected by the frequency detecting means is set to be the currently used radio channel, interference by noise waves emitted by electronic apparatuses around the communication system such as a microwave oven can be prevented.

Furthermore, the invention provides a communication terminal apparatus included in a communication system comprising a communication control apparatus connected to an external network for controlling a communication path with the external network; and a plurality of communication terminal apparatuses that perform radio communications with the communication control apparatus, using either one of a plurality of radio channels by a communication method for communication under a predetermined protocol so as to communicate with the external network via the communication control apparatus, wherein the plurality of communication terminal apparatuses are grouped by each communication method under a different protocol, and a radio channel used in a communication method of each group overlaps a radio channel used in a communication method of at least one of the other groups, the communication terminal apparatus comprising channel detecting means for detecting a radio channel currently used by a communication terminal apparatus communicating with the communication control apparatus, and radio communication control means for controlling communications by selecting a radio channel other than the currently used radio channel, based on results of detection by the channel detecting means, at least when establishing communications between a communication terminal apparatus that is not communicating and the communication control apparatus and when switching a radio channel used for communications established between a communication terminal apparatus and the communication control apparatus.

According to the invention, a communication control apparatus connected to an external network for controlling a communication path with the external network and a plurality of communication terminal apparatuses perform radio communications with each other, using either one of a plurality of radio channels by a communication method for communication under a predetermined protocol. The communication terminal apparatus communicates with the external network via the communication control apparatus. The plurality of communication terminal apparatuses are grouped by each communication method under a different protocol, and a radio channel used in a communication method of each group overlaps a radio channel used in a communication method of at least one of the other groups.

Since a radio channel currently used by a communication terminal apparatus communicating with the communication control apparatus is detected by the channel detecting means, a radio channel other than the currently used radio channel is selected for communications by using results of detection by the channel detecting means, at least when establishing communications between a communication terminal apparatus that is not communicating and the communication control apparatus and when switching a radio channel used for communications established between a communication terminal apparatus and the communication control apparatus. Thus, interference between radio channels of radio communications that use a plurality of different communication methods at the same time can be prevented, and the communication speed and the communication speech quality can be improved.

In the invention, it is preferable that the communication terminal apparatus comprises frequency detecting means for detecting the frequency of received radio waves and in that the radio communication control means sets a radio channel including the frequency detected by the frequency detecting means to be the currently used radio channel.

According to the invention, since a radio channel including the frequency of the radio waves detected by the frequency detecting means is set to be the currently used radio channel, interference by noise waves emitted by electronic apparatuses around the communication system such as a microwave oven can be prevented.

Furthermore, the invention provides a communication system comprising a router connected to an external network for controlling a communication path with the external network; a communication terminal apparatus that performs radio communications with the router, using one of a plurality of radio channels by a first communication method for communication under a first protocol so as to communicate with the external network via the router; a host apparatus that performs wired communications with the router and communicates the external network via the router; and a slave apparatus that performs radio communications with the host apparatus, using one of a plurality of radio channels including a radio channel overlapping the radio channel used by the first communication method, by a second communication method for communication under a second protocol that is different from the first protocol and communicates with the external network via the host apparatus and the router, the communication system comprising channel detecting means for detecting a radio channel currently used by a communication terminal apparatus communicating with the router and a radio channel currently used by the slave apparatus communicating with the host apparatus, and radio communication control means for controlling communications by selecting a radio channel other than the currently used radio channel, based on results of the detection by the channel detecting means, at least when establishing communications between a communication terminal apparatus that is not communicating and the router or communications between the host apparatus and the slave apparatus and when switching a radio channel used for communications established between a communication terminal apparatus and the router or communications established between the host apparatus and the slave apparatus.

According to the invention, a router connected to an external network for controlling a communication path with the external network and a communication terminal apparatus perform radio communications with each other, using one of a plurality of radio channels by a first communication method for communication under a first protocol. The communication terminal apparatus communicates with the external network via the router.

The host apparatus that performs wired communication with the router so as to communicate with the external network via the router and the slave apparatus perform radio communications with each other, using one of a plurality of radio channels including a radio channel overlapping the radio channel used by the first communication method, by a second communication method for communication under a second protocol that is different from the first protocol. The slave apparatus communicates with the external network via the host apparatus and the router.

Since a radio channel currently used by a communication terminal apparatus communicating with the router and a radio channel currently used by the slave apparatus communicating with the host apparatus are detected by the channel detecting means, a radio channel other than the currently used radio channel can be selected for communications, using the results of the detection by the channel detecting means, at least when establishing communications between a communication terminal apparatus that is not communicating and the router and communications between the host apparatus and the slave apparatus and when switching a radio channel used for communications established between a communication terminal apparatus and the router or a radio channel used for communications established between the host apparatus and the slave apparatus. Thus, interference between radio channels can be prevented, and the communication speed and the communication speech quality can be improved, when different communication methods, for example, a radio network and a cordless telephone apparatus, are used at the same time.

According to the invention, when different communication methods, for example, of a wireless network and a cordless telephone apparatus, are used at the same time, interference between radio channels can be prevented and the communication speed and the communication speech quality of the radio communications can be improved.

Furthermore, according to the invention, in the radio communications using two communications methods at the same time that use radio channels having different frequency bands from each other, interference between the radio channels can be prevented.

Furthermore, according to the invention, the detection efficiency of the channel detecting means can be improved.

Furthermore, according to the invention, either the communication control apparatus or the communication terminal apparatus can control radio communications.

Furthermore, according to the invention, interference by noise waves emitted from an electronic apparatus in the periphery of the communication system, such as a microwave oven, can be prevented.

Furthermore, according to the invention, the detection efficiency of noise waves by frequency detecting means can be improved.

BRIEF DESCRIPTION OF THE DRAWINGS

Other and further objects, features, and advantages of the invention will be more explicit from the following detailed description taken with reference to the drawings wherein:

FIG. 3 is a table showing an example of the radio channel of the 2.4 GHz band used in wireless LAN;

FIG. 4 is a table showing an example of the radio channel of the 2.4 GHz band used in a cordless telephone apparatus;

FIG. 6 is a flowchart showing processing for connecting the slave apparatus to the host apparatus of a cordless telephone apparatus;

FIG. 19 is a flowchart showing the sending processing in step S88 of FIG. 17.

DETAILED DESCRIPTION OF THE PREFERRED EMBODIMENTS

Figure 1:
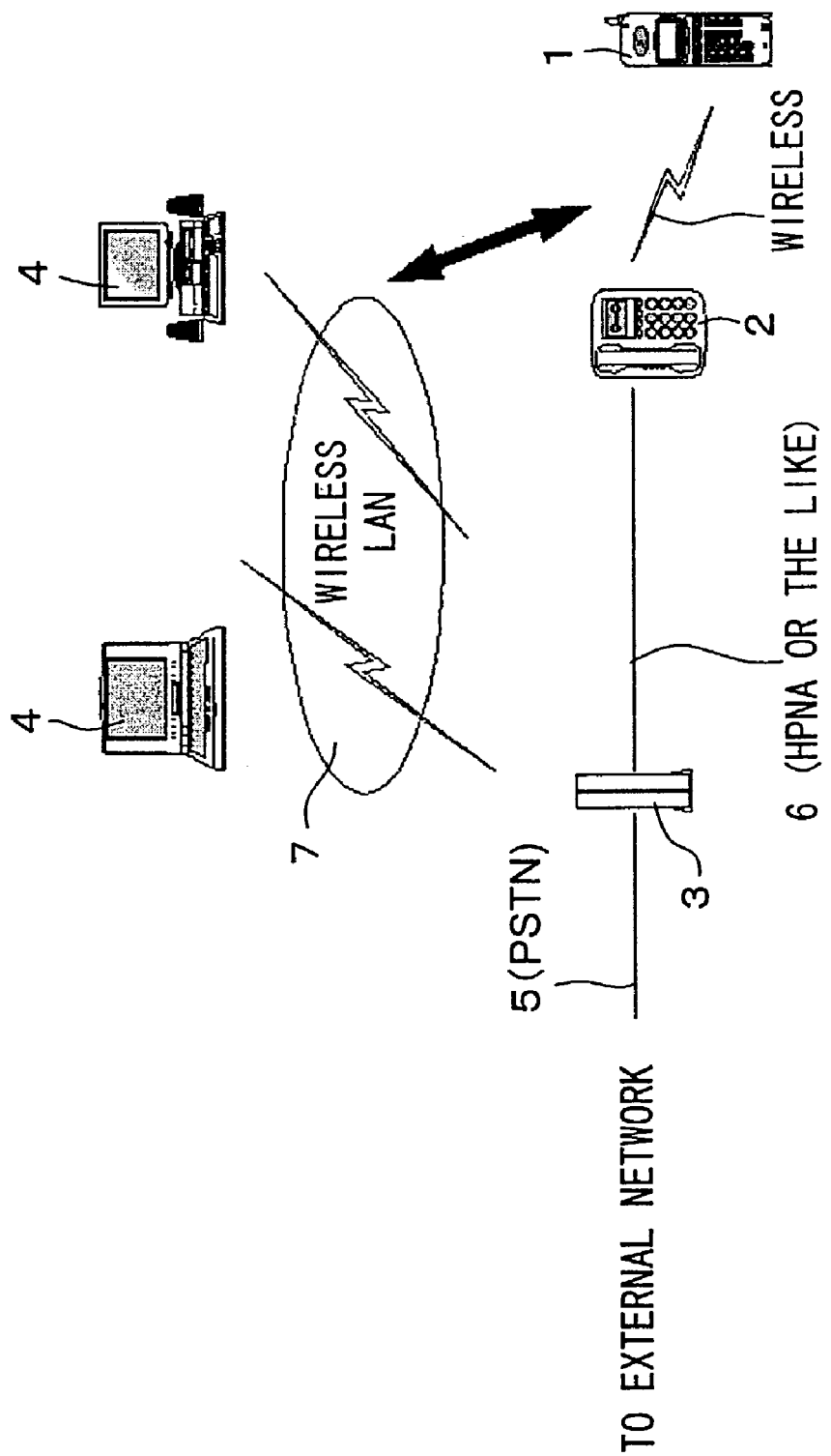
FIG. 1 is a diagram showing the basic configuration of a communication system, which is one embodiment of the invention.

Now referring to the drawings, preferred embodiments of the invention are described below.

FIG. 1 is a diagram showing the basic configuration of a communication system 100, which is one embodiment of the invention. As shown in FIG. 1, The communication system 100 includes a slave apparatus 1 and a host apparatus 2 of a cordless telephone apparatus, a router 3 and personal computers 4. The communication system 100 is connected to an external network including communication terminal apparatuses such as various servers and telephone apparatuses, and wireless and wired communication paths for connecting the communication terminals each other.

The router 3 is connected to the external network via a public line 5 including analog telephone lines, Ethernet, and dedicated lines of optical cables, and is a communication control apparatus for controlling the communication paths in the external network in order that the slave apparatus 1, the host apparatus 2 and the personal computers (PC) 4 perform data communications and voice communications with the communication terminal apparatuses on the external network.

The host apparatus 2 is connected to a wired inhouse network 6 so as to perform wired communications with the router 3 and thus can be communicated with a communication terminal apparatus on the external network via the router 3. The slave apparatus 1 and the host apparatus 2 perform radio communications with each other by the communication method for cordless telephone apparatuses, which is a first communication method, and the slave apparatus 1 is a communication terminal apparatus for performing communications with a communication terminal apparatus on the external network via the host apparatus 2 and the router 3. The communication method for cordless telephone apparatuses is a communication method in which one radio channel of a plurality of radio channels for which a previously allocated frequency band is divided is used, and communications are performed based on the protocol for cordless telephone apparatuses, which is a first protocol. A plurality of slave apparatuses 1 can be connected to one host apparatus 2, and the group consisting of a plurality of slave apparatuses 1 performs radio communications with the host apparatus 2 according to the communication method for cordless telephone apparatuses. A plurality of host apparatuses 2 can be connected to one router 3.

The wired inhouse network 6 can be realized by using transmission paths of the HPNA (Home phone-line networking alliance) standard, power line transmission paths or the like.

The PCs 4 are connected to a wireless LAN (Local Area Network) 7 and perform radio communications with the router 3 by the communication method for wireless LAN, which is a second communication method, and are communication terminal apparatuses for communicating with the external network via the router 3. The communication method for wireless LAN is a communication method in which one radio channel of a plurality of radio channels is used, and communications are performed based on the protocol for wireless LAN, which is a second protocol. The communication methods are defined by the associations such as IEEE (The Institute of Electrical and Electronics Engineers), and ITU (International Telecommunication Union) as a communication standard such as IEEE802.11b, and communication terminal apparatuses are designed in accordance with these communication standards. A plurality of PCs 4 can be connected to one router 3, and the group consisting of a plurality of PCs 4 performs radio communications with the router 3 according to the communication method for wireless LAN. The PCs 4 form a plurality of groups for every different standard, and the plurality groups can be connected to the router 3.

Figure 2:
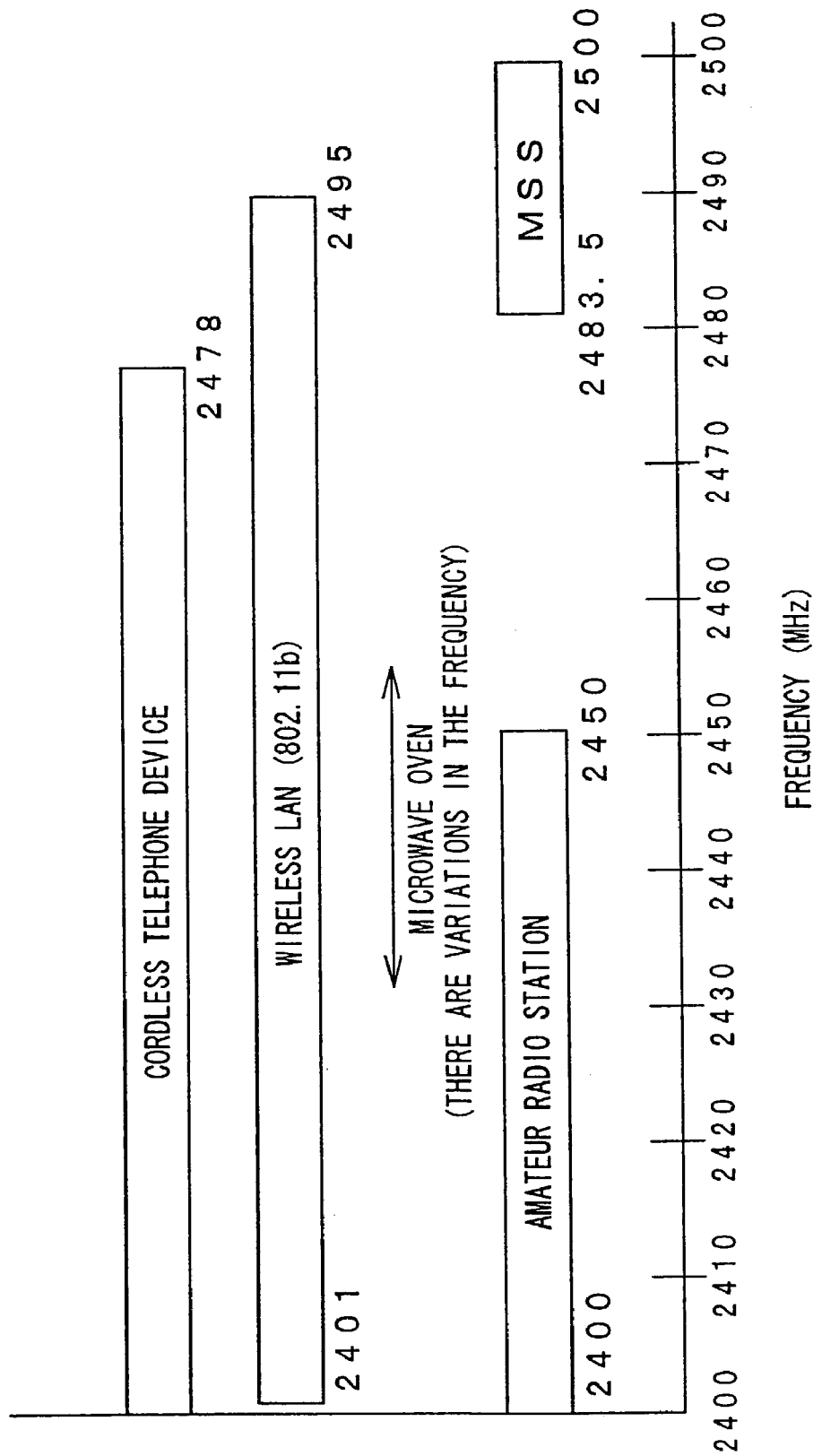
FIG. 2 is a diagram showing an example of frequency bands used in communication methods.

FIG. 2 is a diagram showing an example of the frequency bands used in the communication methods. As shown in FIG. 2, the frequency band used between the host apparatus and the slave apparatus of a cordless telephone apparatus includes the frequency bands used in amateur radio stations, MSS and wireless LAN in the IEEE standard 802.11b. When the communication terminal apparatuses, the cordless telephone apparatuses or the like used in the frequency band called the "2.4 GHz band" are operated under the same environment, their radio waves interfere with each other so that communication failure occurs.

When a plurality of communication terminal apparatuses are used in each communication method at the same time, as shown in FIG. 3, the frequency band is divided into a plurality of radio channels, each of which is a small frequency band, and the communication terminal apparatus uses either one of the radio channels. In this case, in one method such as the IEEE standard 802.11b, all the plurality of communication terminal apparatuses use the same radio channel, and in another method, the plurality of communication terminal apparatuses use different radio channels so that their radio waves do not interfere with each other.

In the case where the same radio channel is used, there is another method, for example, in which a certain cycle is divided into a plurality of time intervals (time slots) and the plurality of communication terminal apparatuses communicate using different time slots.

FIG. 4 is a table showing an example of the radio channels of the 2.4 GHz band used for a cordless telephone apparatus. Forty radio channels can be provided at the maximum, if their center frequencies have an interval of 2 MHz, starting from 2400 MHz, and the band width is 2 MHz. In the IEEE standard 802.11b of FIG. 3, the center frequencies have an interval of 5 MHz, starting from 2412 MHz as the center frequency, and the band width is 22 MHz, and the number of the radio channels is 14. Thus, the number of the divided frequency bands (the number of channels) is different, depending on the communication method, and the center frequency and the band width of each radio channel is different between the communication methods. Even if the radio channel is different between the communication methods, for example, when the radio channel No. 1 of the IEEE standard 802.11b and either one of the radio channels No. 1 to 13 of a cordless telephone apparatus are used at the same time, interference of the radio waves occurs.

In the communication system 100, when performing communications between the slave apparatus 1 and the host apparatus 2 and communications between the PCs 4 and the router 3 at the same time, using different communication methods, the following is performed. The router 3 detects all the radio channels that are used by the slave apparatuses 1 or the PCs 4 in the communication system 100 so that the radio channels in use are avoided when establishing new communications or changing the radio channels. Thus, the communications can be performed without interference occurring.

Figure 5A:
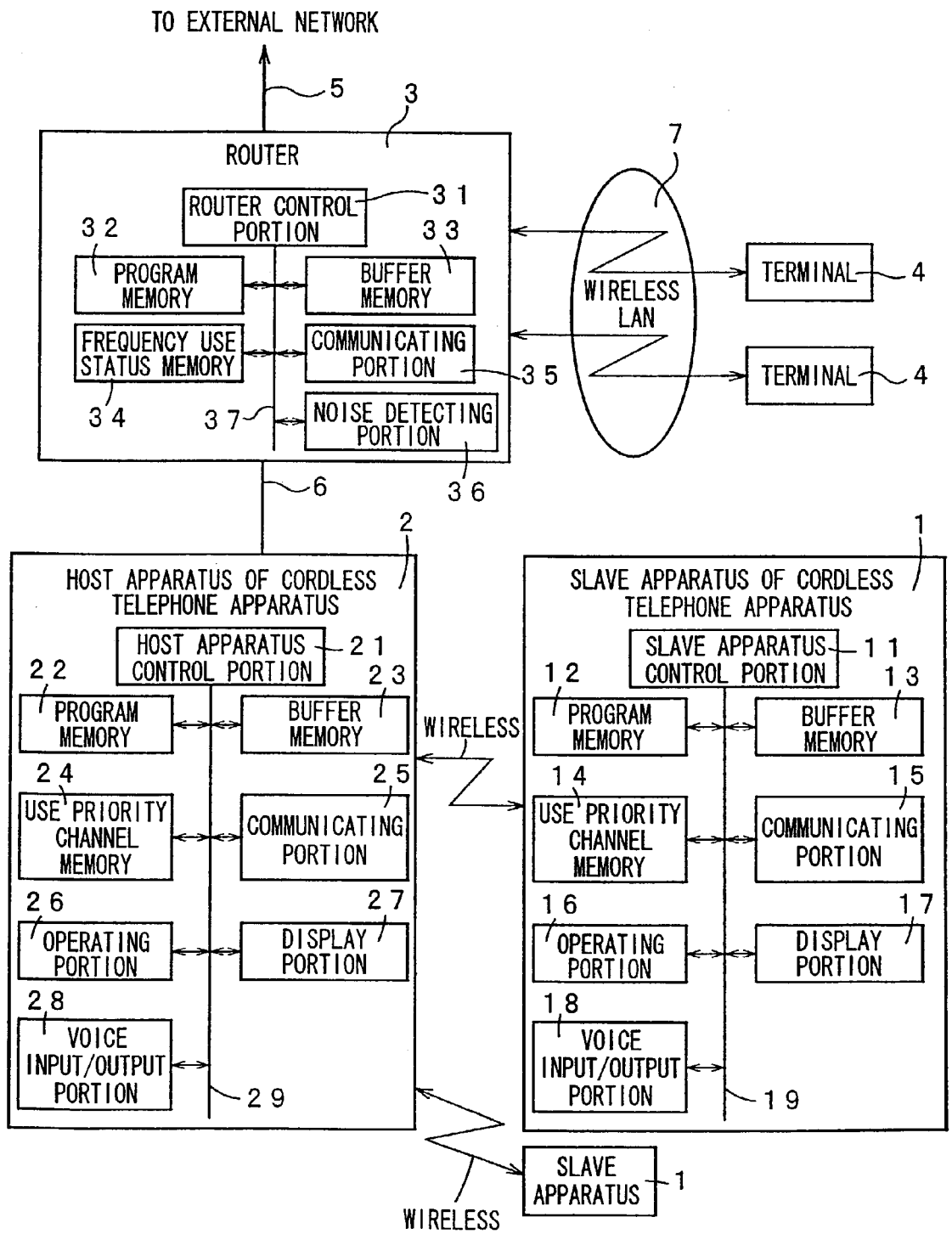
FIGS. 5A and 5B is a block diagram showing the configuration of a slave apparatus, a host apparatus and a router of a cordless telephone apparatus constituting the communication system.
Figure 5B:
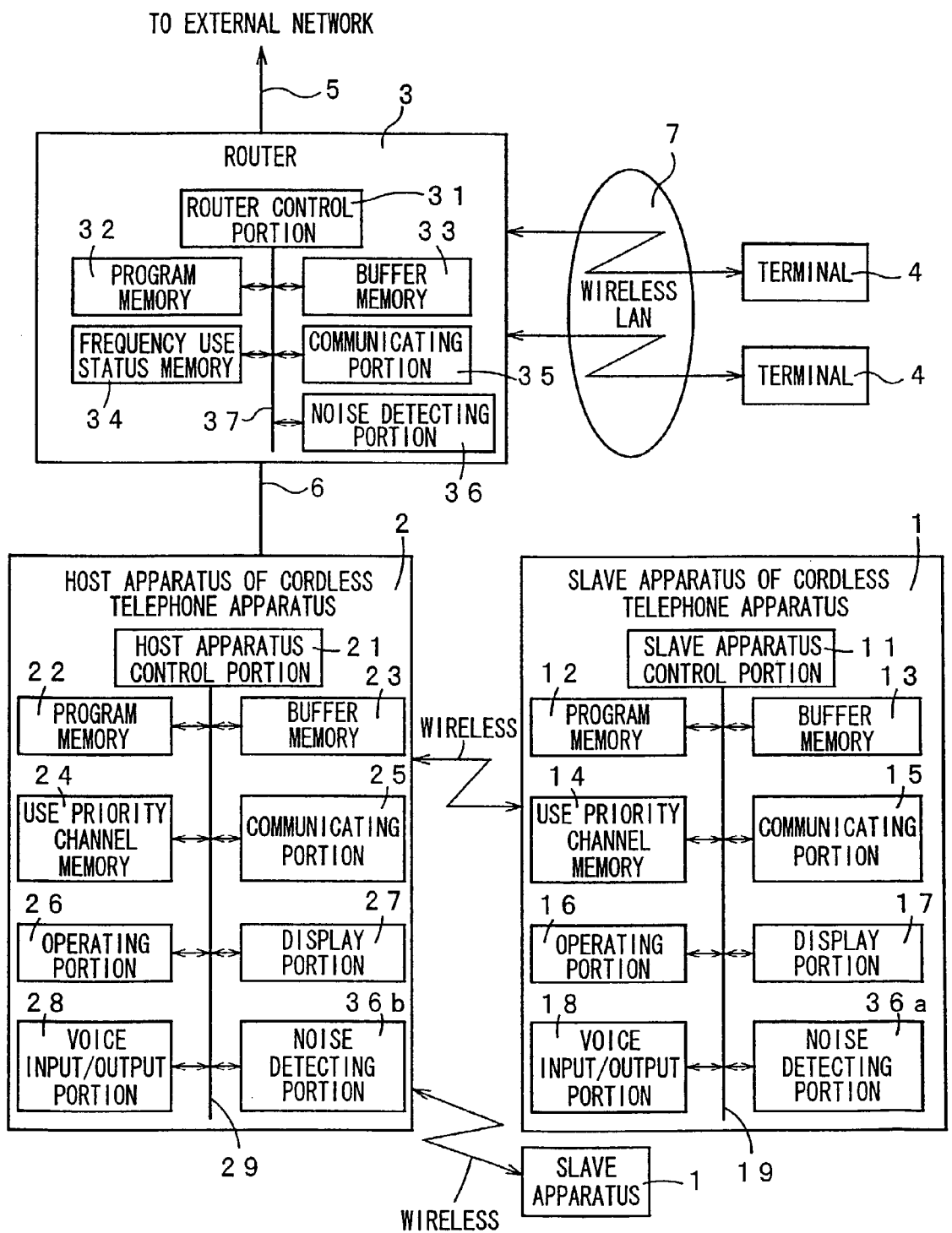

FIGS. 5A and 5B is a block diagram showing the configuration of the slave apparatus 1, and the host apparatus 2 of a cordless telephone apparatus, and the router 3 included in the communication system 100.

The router 3 includes a router control portion 31, a program memory 32, a buffer memory 33, a frequency use status memory 34, a communicating portion 35, a noise detecting portion 36, and a bus 37.

The router control portion 31 includes a CPU (central processing unit) and MPU (micro processing unit), and is radio communication controlling means for controlling a public line 5 (on the upstream side), controlling the transmission paths (on the downstream side) of a wired inhouse network 6 and a wireless LAN 7, controlling the communication path between the PCs 4 and the host apparatus 2 and communication terminal apparatuses on the external network, and controlling the frequency use status memory 34 via the bus 37, by performing a control program stored in the program memory 32. The router control portion 31 is channel detecting means for acquiring the radio channel used for the radio communications with the PCs 4 and the radio channel used for the communications between the slave apparatus 1 and the host apparatus 2 from the communicating portion 35.

The program memory 32 is constituted by a storage medium such as a ROM (Read Only Memory), EEPROM (Electrically Erasable Programmable Read Only Memory), FD (Flexible Disk), HD (Hard Disk), CD (Compact Disk), or MO (Magneto Optical) disk and stores a control program by which the router control portion 31 controls the communication system 100.

The buffer memory 33 is constituted by a storage medium such as a RAM (Random Access Memory), EEPROM, FD, HD, CD, or MO disk and temporarily stores input and output data when the router control portion 31 controls the communication system 100.

The frequency use status memory 34, is constituted by a storage medium such as a RAM, EEPROM, FD, HD, CD, or MO disk and stores a table for frequency in use indicating the frequency band of the radio channel used for the radio communications with the PCs 4 and the frequency band of the radio channel used for the radio communications between the slave apparatus 1 and the host apparatus 2 that are detected by the router control portion 31.

The communicating portion 35 includes a modem (including a digital modem converting function), a signal modulating and demodulating circuit, a radio wave generating portion for generating radio waves of the frequency band of a radio channel, an antenna, and a channel switching portion for switching radio channels, and receives and transmits voice signals and data in the communications with the external network via the public line 5, the communications with the host apparatus 2 via the wired inhouse network 6, and the communications with the PCs 4 via the wireless LAN 7.

The noise detecting portion 36 includes an antenna, a portion for measuring an electrical field intensity, and a portion for analyzing frequency and is frequency detecting means for detecting the frequency of noise waves generated from an electronic apparatus or the like that are outside the communication system 100. The noise detecting portion as shown in FIG. 5B, may be provided in the slave apparatus 1 and the host apparatus 2, in addition to the router.

When the router control portion 31 detects a radio channel in use anew, the table for frequency in use is updated. In addition, when the frequency of noise waves detected by the noise detecting portion 36 is included in the frequency bands of the radio channels used for the radio communications with the PCs 4 and the radio communications between the slave apparatus 1 and the host apparatus 2, the table for frequency in use is updated such that the detected frequency is a radio channel in use.

Examples of an electronic apparatus located outside the communication system 100 include a microwave oven, a television receiver, and an information processing apparatus. When the electronic apparatuses are present in the same environment, the noise waves occurring from the electronic apparatuses are detected (f-scanned) by the noise detecting portion 36.

Furthermore, when a power line LAN is used as the wired inhouse network 6, the router 3 can obtain the frequency in use directly from the microwave oven via the power line LAN.

The router control portion 31 transmits the table for frequency in use or information on the frequency band indicated in the table for frequency in use in response to a request from the slave apparatus 1, the host apparatus 2 and the PCs 4, or transmits the same periodically even if there is no request.

The slave apparatus 1 of a cordless telephone apparatus includes a slave apparatus control portion 11, a program memory 12, a buffer memory 13, a use priority channel memory 14, a communicating portion 15, an operating portion 16, a display portion 17, a voice input/output portion 18, and a bus 19. In addition, as shown in FIG. 5B, the slave apparatus 1 may be provided with a noise detecting portion 36a which has the same configuration as the noise detecting portion 36 of the router 3.

The slave apparatus control portion 11 is constituted by a CPU or an MPU of a computer and is radio communication control means for outputting a control signal via the bus 19 so as to control the entire slave apparatus 1 by executing a control program stored in the program memory 12.

The program memory 12 is constituted by a storage medium such as ROM or EEPROM and stores a control program by which the slave apparatus control portion 11 controls the entire slave apparatus 1.

The buffer memory 13 is constituted by a storage medium such as RAM or EEPROM and stores input/output data when the slave apparatus control portion 11 controls the entire slave apparatus 1.

The use priority channel memory 14 is constituted by a storage medium such as RAM or EEPROM and stores a priority channel table in which the radio channels as shown in FIG. 4 are aligned in such a priority order that the radio channel of the frequency having the least noise comes first.

The slave apparatus control portion 11 updates the priority channel table, when appropriated, such that the radio channel overlapping the radio channel that is used by other apparatuses comes down in the priority order, based on the radio channels used by other slave apparatuses 1 and the table for frequency in use notified of by the router 3 via the host apparatus 2. The priority order of the priority channel table may be initialized at the delivery of the cordless telephone apparatus, or the user can initialize the priority order in view of the installation environment.

The communicating portion 15 includes a radio wave generating portion for generating radio waves of the frequency band of a radio channel to be used, an antenna, a channel switching portion for switching channels for sending and receiving, and a signal modulating/demodulating circuit.

The operating portion 16 is constituted by, for example, ten keys, a key switch and a touch panel, and by the control of the slave apparatus control portion 11, a user inputs, for example, a request instruction of connection with the host apparatus 2 or the PCs 4, a request instruction of transmission of a voice signal, image data or the like.

The display portion 17 can be realized by a compact sized LCD (liquid crystal display), PD (plasma display), or ELD (electroluminescent display) and displays an operation screen, a receiving and sending history, received data by data communications or the like.

The voice input/output portion 18 includes a compact microphone, an A/D (analog/digital) converting circuit, a compact speaker, and a D/A (digital/analog) converting circuit. When a user talks on the telephone, the voice input/output portion 18 converts a voice of the user to a voice signal at the compact microphone and the A/D converting circuit and inputs the voice signal, and converts the voice signal received via the host apparatus 2 to a voice at the D/A converting circuit and outputs the voice from the compact microphone.

The slave apparatus control portion 11 refers to the priority channel table stored in the use priority channel memory 14 when the communications with the host apparatus 2 is established. The radio channel that is in the highest place in the priority order is allocated as the initial channel, and a connection request instruction is transmitted to the host apparatus 2 with a radio wave of the frequency band of the initial channel from the communicating portion 15. When the radio channel used by other slave apparatuses 1 and the frequency bands used by the PCs 4 interfere with the initial channel, the radio channel overlapping that frequency band is avoided, and the radio channel of the frequency placed next in the priority order is selected. Furthermore, when changing the radio channel for the already established communications with the host apparatus 2, the radio channel used by other slave apparatuses 1 and the radio channel overlapping the frequency band used between the router 3 and the PCs 4 are avoided, and the radio channel of the frequency placed next in the priority order is selected.

Thus, the slave apparatus 1 updates the priority channel table based on the frequency bands used by other slave apparatuses 1 and the PC 4 and selects a radio channel that is not used so as to perform radio communications with the host apparatus 2.

The host apparatus 2 of a cordless telephone apparatus includes a host apparatus control portion 21, a program memory 22, a buffer memory 23, a use priority channel memory 24, a communicating portion 25, an operating potion 26, a display portion 27, a voice input/output portion 28, and a bus 29. In addition, as shown in FIG. 5B, the host apparatus 2 may be provided with a noise detecting portion 36b which has the same configuration as the noise detecting portion 36 of the router 3.

The host apparatus control portion 21 is constituted by a CPU or an MPU and is radio communication control means for outputting a control signal via the bus 29 so as to control the entire host apparatus 2 by executing a control program stored in the program memory 22. The host apparatus control portion 21 transmits the frequency band of the radio channel used for the radio communications with the slave apparatus 1 from the communicating portion 25 to the router 3.

The program memory 22 is constituted by a storage medium such as ROM or EEPROM and stores a control program by which the host apparatus control apparatus 21 controls the entire host apparatus 2. The buffer memory 23 is constituted by a storage medium such as RAM or EEPROM and stores input/output data when the host apparatus control apparatus 21 controls the entire host apparatus 2.

In this embodiment, the host apparatus 2 also has the use priority channel memory 24 having the same function as that of the use priority channel memory 14 of the slave apparatus 1. The use priority channel memory 24 is constituted by RAM, EEPROM or the like and stores a priority channel table in which the radio channels are aligned in such a priority order that the radio channel of the frequency having the least noise comes first.

The host apparatus control portion 21 updates the priority channel table, when appropriated, based on all the radio channels used by the slave apparatuses 1 that are communicating and the table for frequency in use notified of by the router 3. The priority order of the priority channel table may be initialized at the delivery of the cordless telephone apparatus, or the user can initialize the same in view of the installation environment.

The communicating portion 25 includes a radio communicating portion including a radio wave generating portion for generating radio waves of the frequency band of a radio channel to be used, an antenna, a channel switching portion for switching channels for sending and receiving, and a radio communicating portion constituted a signal modulating/demodulating circuit or the like, and a wired communicating portion including an interface portion for connecting the wired inhouse network 6 so as to communicate with the router 3, and a signal modulating/demodulating circuit or the like.

The operating portion 26 is constituted by, for example, ten keys, a key switch and a touch panel, and by the control of the host apparatus control portion 21, a user inputs, for example, a request instruction of connection with the slave apparatus 1 or the PCs 4, a request instruction of transmission of a voice signal, image data or the like.

The display portion 27 can be realized by a compact sized LCD, PD, or ELD that has a larger size than that of the display portion 17 of the slave apparatus 1 and displays an operation screen, a receiving and sending history, received data by data communications or the like.

The voice input/output portion 28 includes a compact microphone, an A/D converting circuit, a compact speaker, and a D/A converting circuit. When a user talks on the telephone, the voice input/output portion 28 converts a voice of the user to a voice signal at the compact microphone and the A/D converting circuit and inputs the voice signal, and converts a received voice signal to a voice at the D/A converting circuit and outputs the voice from the compact microphone.

If it is sufficient that the host apparatus 2 serves only as a relay apparatus between the router 3 and the slave apparatus 1, the host apparatus 2 does not have to include the operating portion 26, the display portion 27 or the voice input/output portion 28.

The host apparatus control portion 21 refers to the priority channel table stored in the use priority channel memory 24 when the communications with the slave apparatus 1 is established. The radio channel that is in the highest place in the priority order is allocated as the initial channel, and a connection request instruction -is transmitted to the slave apparatus 1 with a radio wave of the frequency band of the initial channel from the communicating portion 25. When the radio channel used by other slave apparatuses 1 and the frequency band used by the PCs 4 interfere with the initial channel, the radio channel overlapping that frequency band is avoided, and the radio channel of the frequency placed next in the priority order is selected. Furthermore, when changing the radio channel for the already established communications with the slave apparatus 1, the radio channel used by other slave apparatuses 1 and the radio channel overlapping the frequency band used by the PCs 4 can be avoided, and the radio channel of the frequency placed next in the priority order can be selected.

Thus, the host apparatus 2 updates the priority channel table, based on the frequency bands used by other slave apparatuses 1 and the PCs 4 and selects a radio channel that is not used so as to perform radio communications with the slave apparatus 1. Furthermore, as in this embodiment, if the slave apparatus 1 and the host apparatus 2 both have the priority channel tables, it is not necessary to notify the other apparatus to be communicated with of the selected radio channel, so that the time required at the time of communication establishment and switching of the radio channels can be reduced. When only one of the slave apparatus 1 and the host apparatus 2 has the priority channel table, the apparatus that has the priority channel table selects a radio channel at the time of communication establishment and switching of the radio channels, and notifies the other apparatus of the selected radio channel, and then starts communications or switches the radio channels.

Conventional personal computers can be used as the PCs 4, and any personal computer can be used, as long as it is provided with a radio communication apparatus according to the communication standard used in the wireless LAN 7, such as the IEEE standard 802.11b (e.g., a PC card including an antenna, an extension board and a communication antenna) as a peripheral apparatus.

As the communication terminal apparatus, not only a PC, but also a printer, a facsimile, a household electric appliance can be used, as long as it can perform radio communications.

As described above, in the communication system 100, the router 3 transmits the table for frequency in use indicating the frequency bands of the radio channels used by the slave apparatus 1, the host apparatus 2 and the PCs 4, and the frequency detected by the noise detecting portion 36 to the slave apparatus 1, the host apparatus 2 and the PCs 4. At the communication establishment and the switching of the radio channels, the slave apparatus control portion 11 of the slave apparatus 1, the host apparatus control portion 21 of the host apparatus 2 and the router control portion 31 of the router 3 select a radio channel other than the frequency bands that are currently used and perform radio communications.

FIG. 6 is a flowchart showing processing for connecting the slave apparatus 1 to the host apparatus 2 of the cordless telephone apparatus. The slave apparatus 1 performs radio communications with the host apparatus 2 and periodically acquires the radio channels used by other slave apparatus 1, the frequency bands used by the PCs 4 for the radio communications with the router 3 and the frequency of noise waves occurring outside the communication system 100 in the form of the table for frequency in use from the router 3 via the host apparatus 2 so as to update and store the priority channel table.

First, when the slave apparatus 1 is turned on, the priority channel table of the use priority channel memory 14 is referred to in step S1. In step S2, the radio channels that are already used and cannot be used are avoided, and a radio channel that is in the highest place in the priority order is used as an NOW channel. In step S3, a notification for operation confirmation is transmitted from the communicating portion 15 to the host apparatus 2, using the NOW channel. In step S4, the slave apparatus control portion 11 determines whether or not there is a response from the host apparatus 2. When there is no response, the procedure goes back to step S3, and when there is a response, the procedure goes to step S5.

In step S5, the slave apparatus control portion 11 determines whether or not the table for frequency in use is transmitted from the host apparatus 2. When it is transmitted, the procedure goes to step S6, and when it is not transmitted, the procedure goes to step S7. In step S6, the slave apparatus control portion 11 updates and stores the priority channel table stored in the use priority channel memory 14, based on the table for frequency in use that has been transmitted. In step S7, it is determined whether or not there is a request to switch the radio channels from the host apparatus 2. When there is a request, the procedure goes to step S8, and when there is no request, the procedure goes to step S9. In step S8, the radio channel that is next to the currently used NOW channel in the priority order in the priority channel table is put in the highest place, and the NOW channel is switched to this radio channel for use. In step S9, the slave apparatus control portion 11 determines whether or not there is a receive request from the host apparatus 2. When there is a receive request, the procedure goes to step S10, and when there is no receive request, the procedure goes to step S11.

In step S10, receiving processing is performed. In step S11, it is determined whether or not dial sending operation has been performed by the operating portion 16. When the operation has been performed, the procedure goes to step S12, and when the operation is not performed, the procedure goes back to step S1. In step S12, sending operation is performed, and the procedure goes back to step S1.

Figure 7:
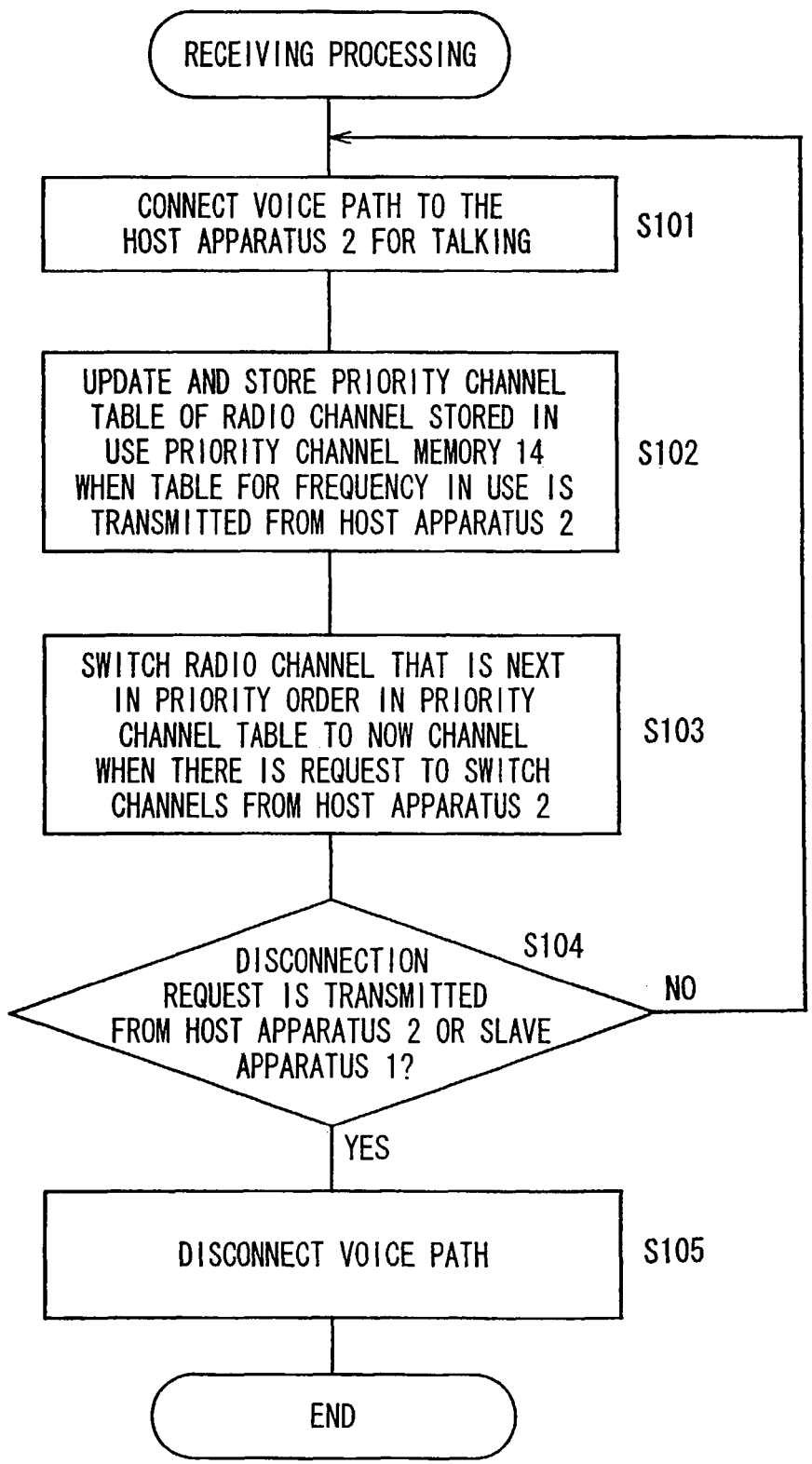
FIG. 7 is a flowchart showing the receiving processing in step S10 of FIG. 6.

FIG. 7 is a flowchart showing the receiving processing in step S10 of FIG. 6. First, in step S101, a voice path to the host apparatus 2 is established to allow talking on the telephone. In step S102, when the table for frequency in use is transmitted from the host apparatus 2, the priority channel table stored in the use priority channel memory 14 is updated and stored. In step S103, when there is a request to switch the radio channels from the host apparatus 2, the radio channel that is next to the currently used NOW channel in the priority order in the priority channel table is put in the highest place, and the NOW channel is switched to this radio channel for use. In step S104, it is determined whether or not there is a disconnection request from the host apparatus 2 or a disconnection operation by the operating portion 16. When there is a request or an operation, the procedure goes to step S105, and when there is no request or operation, the procedure goes back to step S101. In step S105, the voice path is disconnected.

Figure 8:
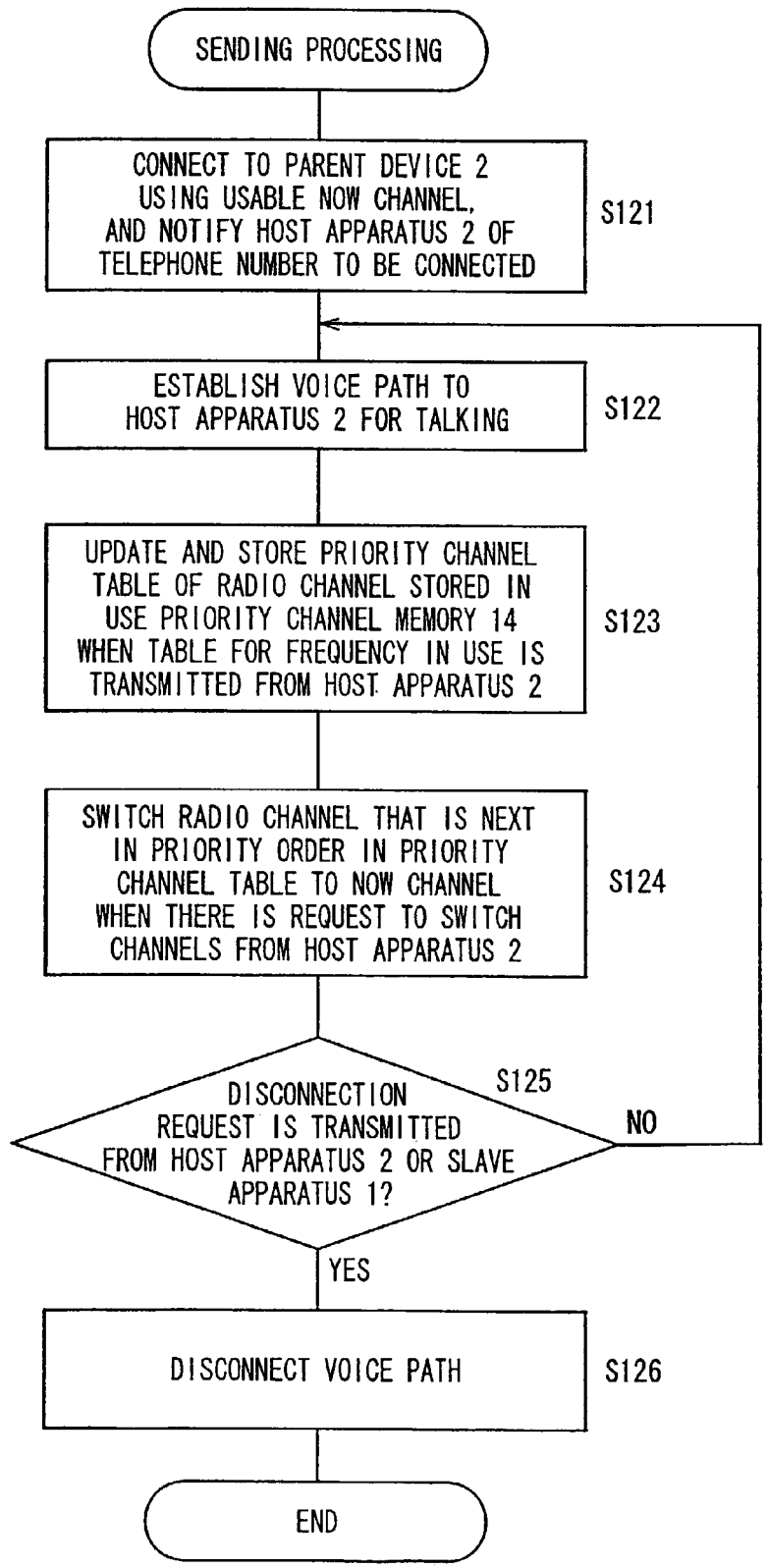
FIG. 8 is a flowchart showing the sending processing in step S12 of FIG. 6.

FIG. 8 is a flowchart showing the sending processing in step S12 of FIG. 6. First, in step S121, a connection to the host apparatus 2 is established using the NOW channel, and the host apparatus 2 is notified of the telephone number to be connected. In step S122, a voice path to the host apparatus 2 is established to allow talking on the telephone. In step S123, if the table for frequency in use is transmitted from the host apparatus 2, the priority channel table stored in the use priority channel memory 14 is updated and stored. In step S124, when there is a request to switch the radio channels from the host apparatus 2, the radio channel that is next to the currently used NOW channel in the priority order in the priority channel table is put in the highest place, and the NOW channel is switched to this radio channel for use. In step S125, it is determined whether or not there is a disconnection request from the host apparatus 2 or a disconnection operation by the operating portion 16. When there is a request or an operation, the procedure goes to step S126, and when there is no request or operation, the procedure goes back to step S121. In step S126, the voice path is disconnected.

Figure 9:
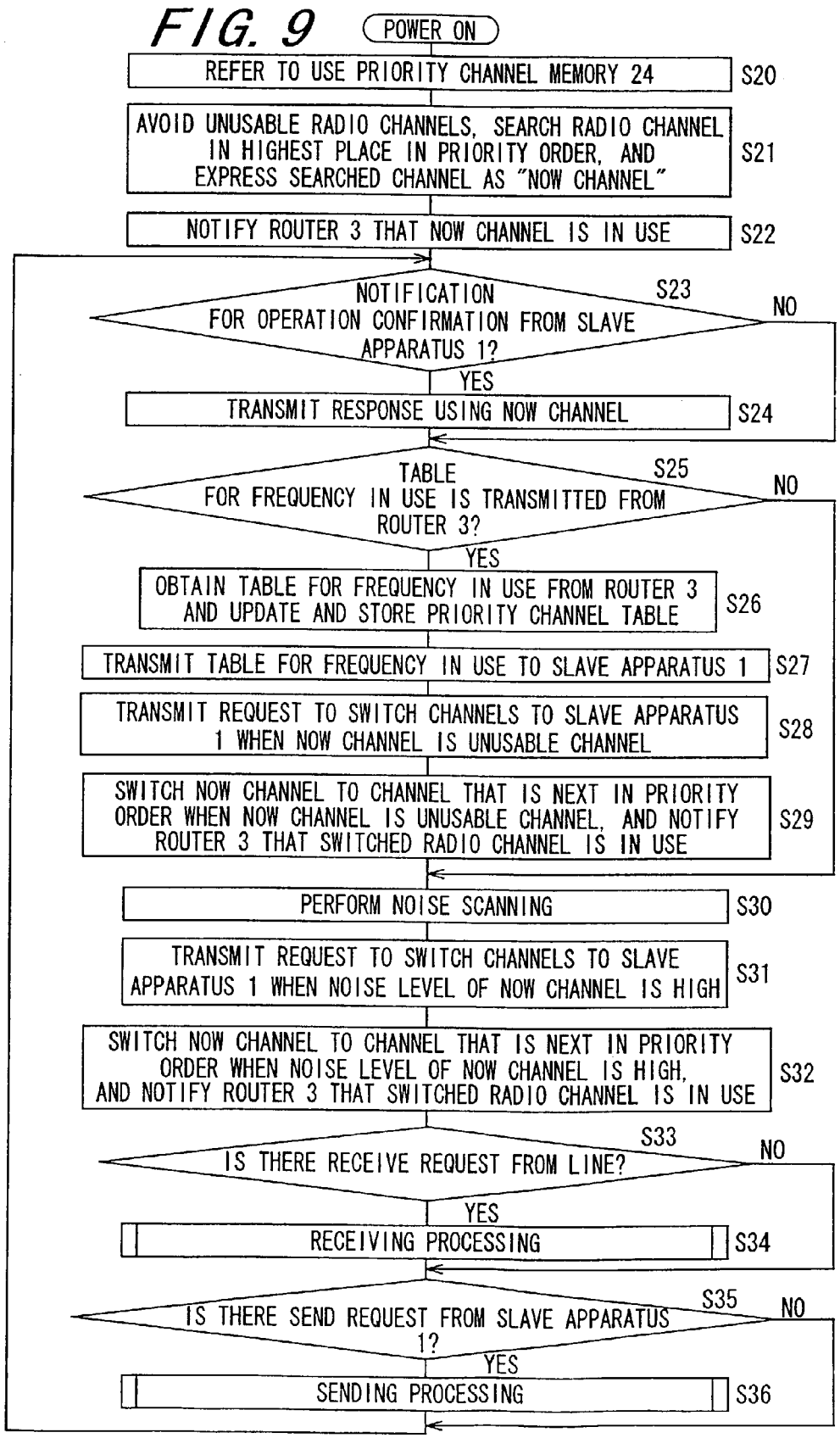
FIG. 9 is a flowchart showing processing for connecting the host apparatus to the slave apparatus of a cordless telephone apparatus.

FIG. 9 is a flowchart showing processing for connecting the host apparatus 2 to the slave apparatus 1 of the cordless telephone apparatus. The host apparatus 2 is connected to the router 3 via the wired inhouse network 6, and periodically acquires the frequency band used by the PCs 4 and the frequencies of externally generated noise waves in the form of a table for frequency in use from the router 3 so as to update and store the priority channel table.

First, in step S20, the priority channel table in the use priority channel memory 24 is referred to. In step S21, the radio channels that cannot be used are avoided, and a radio channel that is in the highest place in the priority order is used as the NOW channel. In step S22, the router 3 is notified that the NOW channel is a radio channel in use. In step S23, the host apparatus control portion 21 determines whether or not there is a notification for operation confirmation from the slave apparatus 1. When there is a notification, the procedure goes to step S24, and when there is no notification, the procedure goes to step S25. In step S24, a response is transmitted using the NOW channel.

In step S25, the host apparatus control portion 21 determines whether or not the table for frequency in use is transmitted from the router 3. When it is transmitted, the procedure goes to step S26, and when it is not transmitted, the procedure goes to step S30. In step S26, the priority channel table is updated and stored, based on the table for frequency in use that has been transmitted from the router 3. In step S27, the table for frequency in use is transmitted to the slave apparatus 1. In step S28, if the NOW channel is a radio channel that cannot be used, the slave apparatus 1 is notified of a request to switch the radio channels. In step S29, the radio channel that is next to the currently used NOW channel in the priority order in the priority channel table is put in the highest place, and the NOW channel is switched to this radio channel for use. The router 3 is notified that the switched radio channel is a radio channel in use.

In step S30, noise scanning is performed. In step S31, if the noise level of the NOW channel is higher than the predetermined threshold value, the slave apparatus 1 is notified of a request to switch the radio channels. In step S32, when the noise level of the NOW channel is higher than the predetermined threshold value in the same manner as in step S31, the NOW channel is switched to the radio channel that is next in the priority order in the priority channel table, and the router 3 is notified that the NOW channel is a radio channel in use.

In step S33, it is determined whether or not there is a receive request from the public line 5, and if there is a request, the procedure goes to step S34, and if there is no request, the procedure goes to step S35.

In step S34, receiving processing is performed. In step S35, it is determined whether or not there is a send request from the slave apparatus 1. When there is a request, the procedure goes to step S36, and when there is no request, the procedure goes back to step S20. In step S36, sending processing is performed, and the procedure goes back to step S20.

Figure 10:
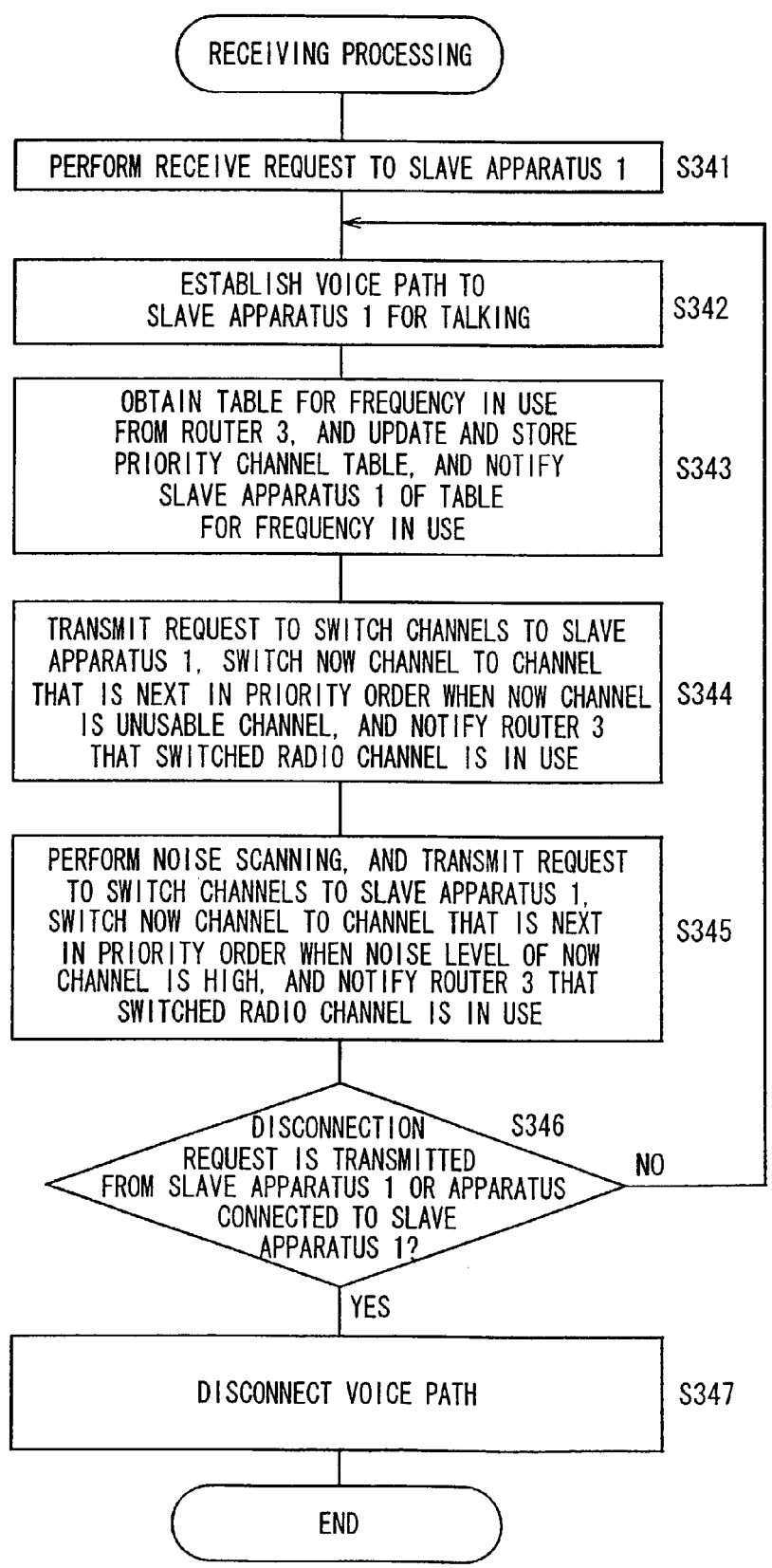
FIG. 10 is a flowchart showing the receiving processing in step S34 of FIG. 9.

FIG. 10 is a flowchart showing the receiving processing in step S34 of FIG. 9. First, in step S341, the slave apparatus 1 is notified of a receive request. In step S342, a voice path to the slave apparatus 1 is established so as to allow talking on the telephone. In step S343, the table for frequency in use is acquired from the router 3, and the priority channel table is updated and stored. Furthermore, the table for frequency in use is transmitted to the slave apparatus 1. In step S344, when the NOW channel is a radio channel that cannot be used, the slave apparatus 1 is notified of a request to switch the radio channels, and the radio channel that is next to the currently used NOW channel in the priority order in the priority channel table is put in the highest place, and the NOW channel is switched to this radio channel for use. The router 3 is notified that the switched radio channel is a radio channel in use. In step S345, noise scanning is performed. If the noise level of the NOW channel is higher than the predetermined threshold value, the slave apparatus 1 is notified of a request to switch the radio channels, the radio channel that is next to the currently used now channel in the priority order in the priority channel table is put in the highest place, and the NOW channel is switched to this radio channel for use. The router 3 is notified that the switched radio channel is a radio channel in use. In step S346, it is determined whether or not there is a disconnection request from the slave apparatus 1 or the apparatus connected to the slave apparatus 1. When there is a request, the procedure goes to step S347, and when there is no request, the procedure goes back to step S342. In step S347, the voice path is disconnected, and talking on the telephone ends.

Figure 11:
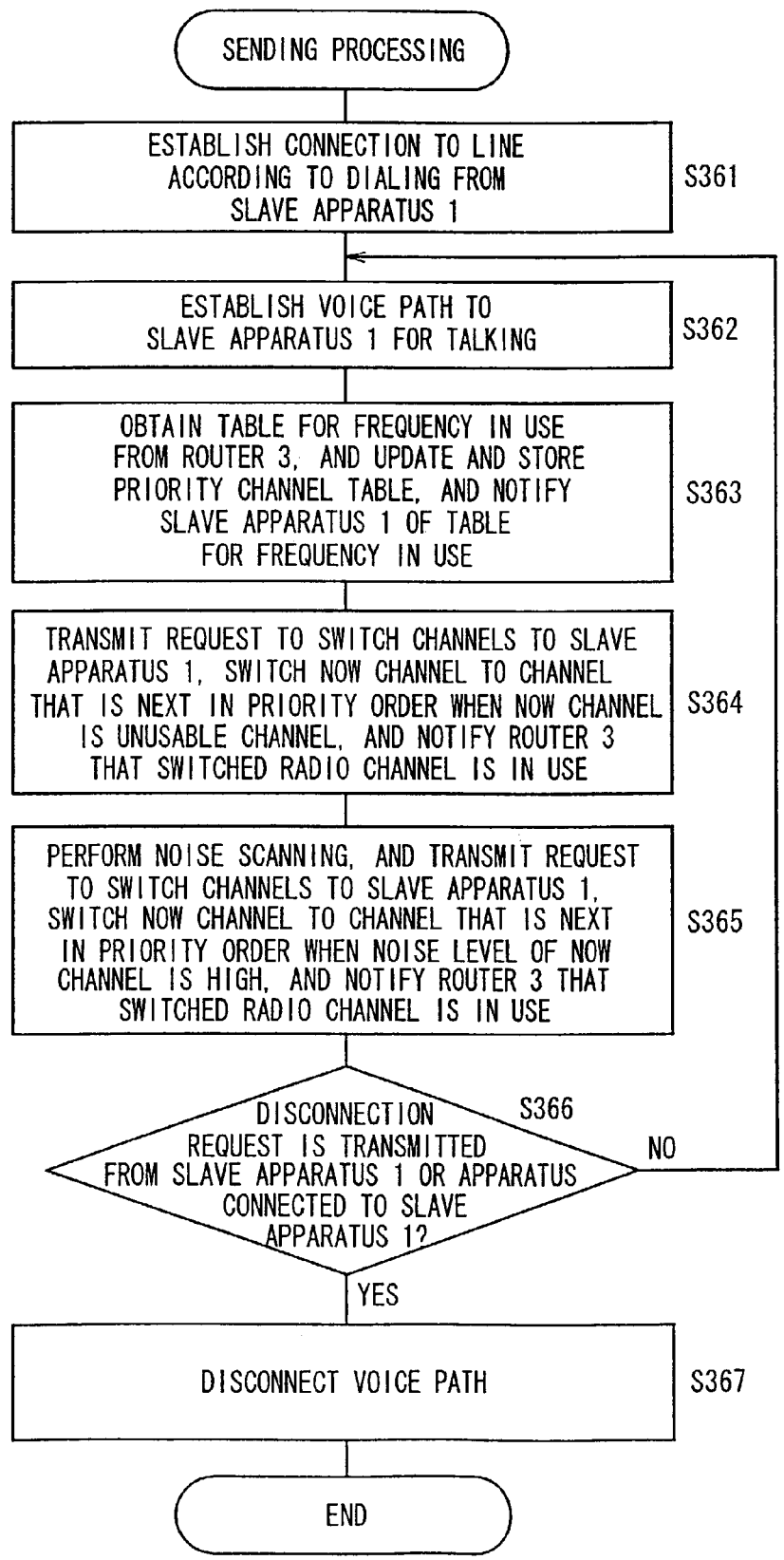
FIG. 11 is a flowchart showing the sending processing in step S36 of FIG. 9.

FIG. 11 is a flowchart showing the sending processing in step S36 of FIG. 9. First, in step S361, a connection to the public line 5 is established according to a dial signal transmitted from the slave apparatus 1. In step S362, a voice path to the slave apparatus 1 is established so as to allow talking on the telephone. In step S363, the table for frequency in use is acquired from the router 3, and the priority channel table is updated and stored. Furthermore, the table for frequency in use is transmitted to the slave apparatus 1. In step S364, when the NOW channel is a radio channel that cannot be used, the slave apparatus 1 is notified of a request to switch the radio channels, and the radio channel that is next to the currently used NOW channel in the priority order in the priority channel table is put in the highest place, and the NOW channel is switched to this radio channel for use. The router 3 is notified that the switched radio channel is a radio channel in use. In step S365, noise scanning is performed. If the noise level of the NOW channel is higher than the predetermined threshold value, the radio channel that is next to the currently used now channel in the priority order in the priority channel table is put in the highest place, and the NOW channel is switched to this radio channel for use. The router 3 is notified that the switched radio channel is a radio channel in use. In step S366, it is determined whether or not there is a disconnection request from the slave apparatus 1 or the apparatus connected to the slave apparatus 1. When there is a request, the procedure goes to step S367, and when there is no request, the procedure goes back to step S362. In step S367, the voice path is disconnected, and talking on the telephone ends.

Figure 12:
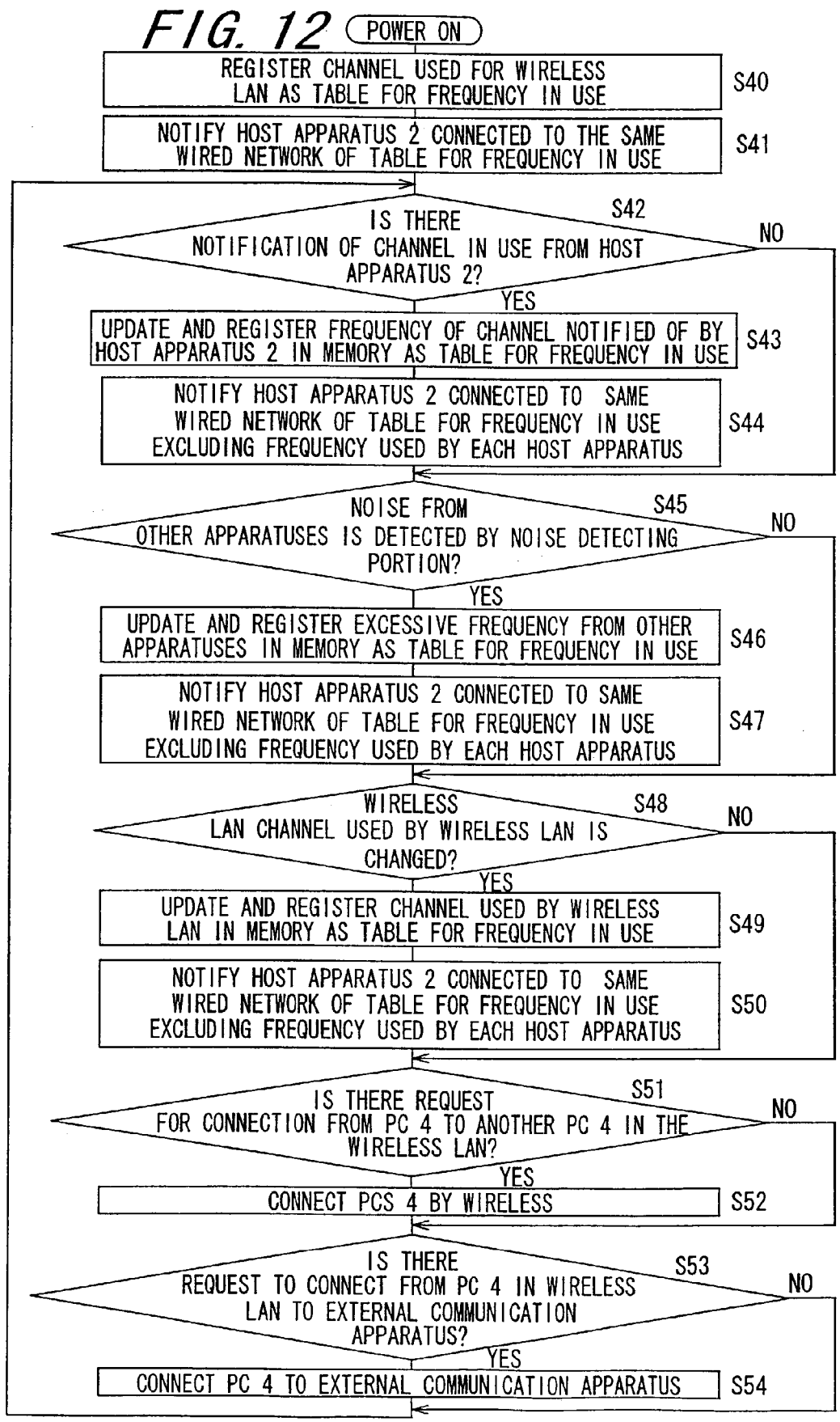
FIG. 12 is a flowchart showing communication control processing of a router.

FIG. 12 is a flowchart showing processing for communication control of a router 3. The router 3 performs wired communications with the host apparatus 2 via the wired inhouse network 6 and performs radio communications with the PCs 4 via the wireless LAN 7. The radio channels used for the communications between the slave apparatus 1 and the host apparatus 2, the radio channel used for the wireless LAN communications with the PCs 4 and the frequencies of externally generated noise waves are acquired periodically, and the table for frequency in use is updated and stored.

First, in step S40, the router control portion 31 registers the radio channel used for the radio communications with the PCs 4 in the table for frequency in use. In step S41, the table for frequency in use is transmitted to the host apparatus 2 connected to the wired inhouse network 6. In step S42, it is determined that there is a notification of the radio channel in use from the host apparatus 2. When there is a notification, the procedure goes to step S43, and when there is no notification, the procedure goes to step S45.

In step S43, the frequency band of the radio channel notified of by the host apparatus 2 is registered in the table for frequency in use. In step S44, the table for frequency in use is transmitted to the host apparatus 2 connected to the wired inhouse network 6. However, the frequency band used by the host apparatus 2 to which the table is transmitted is omitted from the table for frequency in use to be transmitted to that host apparatus 2. In step S45, it is determined whether or not the noise detecting portion 36 has detected noise waves generated from apparatuses outside the communication system 100. When it has detected noise waves, the procedure goes to step S46, and when it has not detected, the procedure goes to step S48. In step S46, the frequency detected by the noise detecting portion 36 is registered in the table for frequency in use. In step S47, the table for frequency in use is transmitted to the host apparatus 2 connected to the wired inhouse network 6. However, the frequency band used by the host apparatus 2 to which the table is transmitted is omitted from the table for frequency in use to be transmitted to that host apparatus 2.

In step S48, it is determined whether or not the radio channel used by the wireless LAN 7 has been changed. When it has been changed, the procedure goes to step S49, and when it has not been changed, the procedure goes to step S51. In step S49, the radio channel used by the wireless LAN 7 is registered in the table for frequency in use. In step S50, the table for frequency in use is transmitted to the host apparatus 2 connected to the wired inhouse network 6. However, the frequency band used by the host apparatus 2 to which the table is transmitted is omitted from the table for frequency in use to be transmitted to that host apparatus 2.

In step S51, it is determined whether or not there is a request for communication from a PC 4 to another PC 4 that are connected to the wireless LAN 7. When there is a request, the procedure goes to step S52, and when there is no request, the procedure goes to step S53. In step S52, the PC 4 that made a communication request can communicate with the PC 4 to which a communication request is directed. In step S53, it is determined whether or not there is a request to connect to a telephone apparatus on the external network from the host apparatus 2 or a request to communicate with a communication apparatus on the external network from the PC 4. When there is a request, the procedure goes to step S54, and when there is no request, the procedure goes back to step S40. In step S54, the host apparatus 2 is connected to the telephone apparatus on the external network, or the PC 4 is connected to the communication apparatus on the external network.

As described above, the slave apparatus 1 and the host apparatus 2 of a cordless telephone apparatus obtain information on the frequency used by other apparatuses from the router 3 in the form of a table for frequency in use, and the priority order of the radio channel is set based on the obtained information on the frequency. Therefore, in a cordless telephone apparatus, the interference between the radio channels is prevented by selecting a radio channel according to the priority order at the time of establishing communications and the time of changing the radio channel. Thus, the communication speed and the communication speech quality of radio communications can be improved.

In the above description, the priority order of the priority channel table is rewritten when the radio channel is selected, but the radio channel can be selected in the following manner without rewriting the priority channel table. The priority order is switched to the channel one below sequentially and when the channel in the lowest in the priority order is reached, it is switched to the channel in the highest. With respect to the radio channel used at the time of establishing communications, one of the radio channels stored in the priority channel table may be used as described above. Alternatively, when one of the apparatuses that communicate with each other does not have the priority channel table, one channel for control is previously set and can be used.

Next, other embodiments of the invention will be described. In the above-described embodiment, a radio channel is selected based on the priority order. However, in this embodiment, the priority order of the radio channels is not set, and when the initially set radio channel cannot be used at the time of establishing communications and changing the radio channels, one of a plurality of radio channels is selected with random numbers.

Figure 13A:
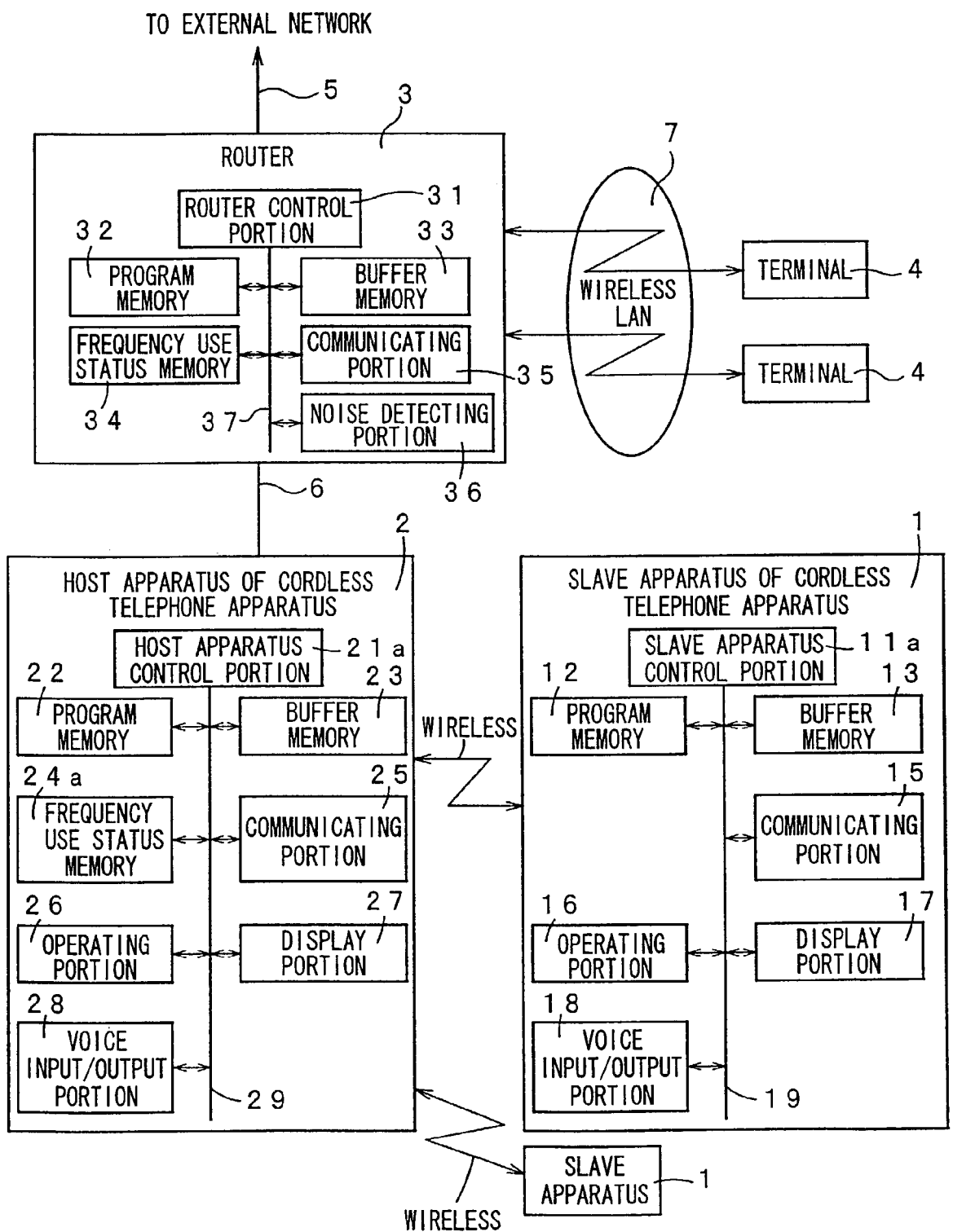
FIGS. 13A and 13B is a block diagram showing the configuration of a slave apparatus, a host apparatus and a router of another embodiment of the invention.
Figure 13B:
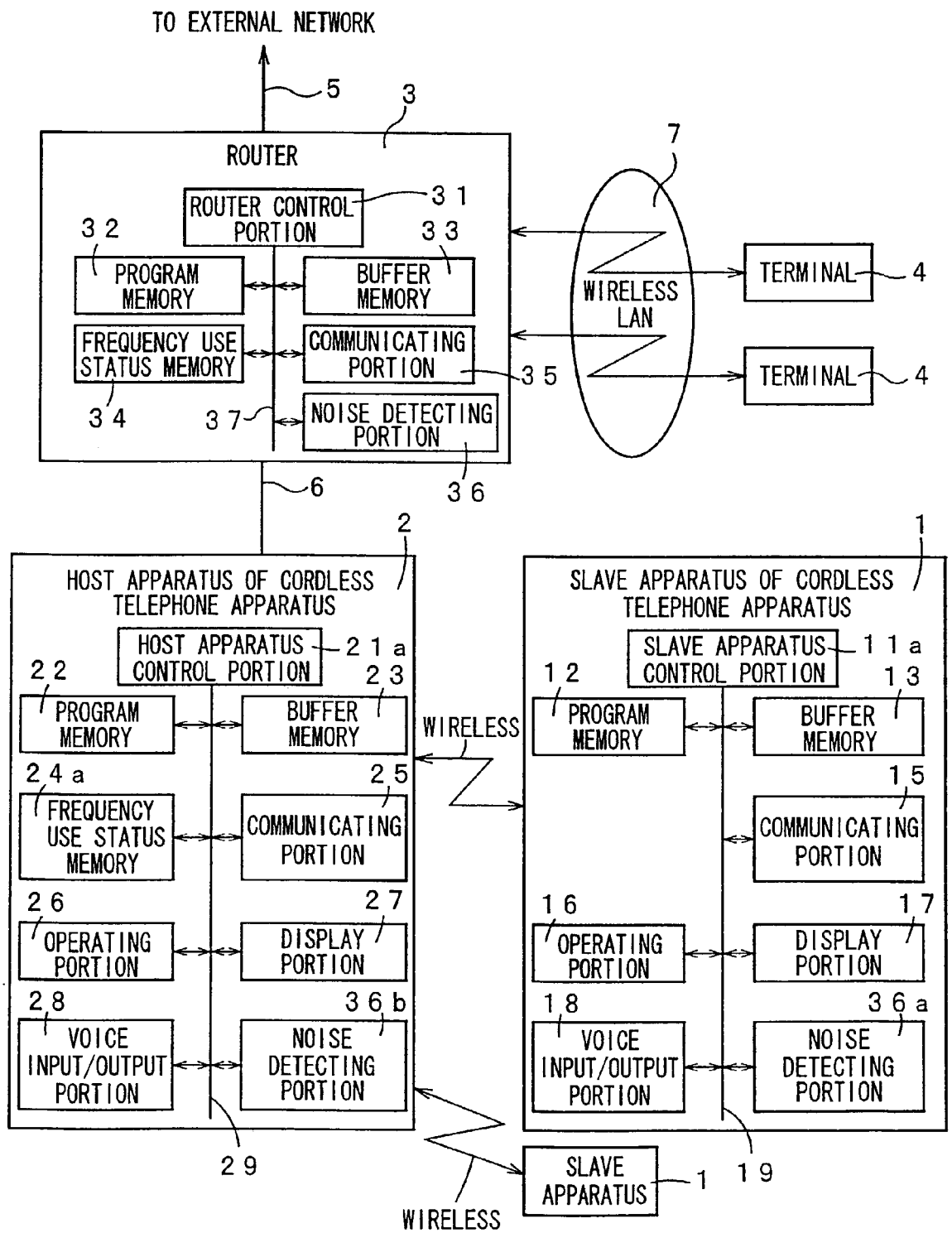

The configuration of the communication system of this embodiment is the same as that of the communication system 100 shown in FIG. 1. FIGS. 13A and 13B is a block diagram showing the configuration of the slave apparatus 1, the host apparatus 2 and the router 3 of this embodiment. The configuration of the slave apparatus 1 is the same as that shown in FIG. 5, except that the use priority channel memory 14 is not included. The host apparatus 2 is the same as that shown in FIG. 5, except that the use priority channel memory 24 is replaced by the frequency use status memory 24a. The configuration of the router 3 is the same as that shown in FIG. 5. Hereinafter, the operations of the frequency use status memory 24a, the slave apparatus control portion 11a, and the host apparatus control portion 21a will be described. The portions other than those are the same as those in the previous embodiment in terms of how they are called and operated, so that they bear the same reference numeral as in FIG. 5 and will not be described further.

The frequency use status memory 24a is constituted by RAM, EEPROM or the like and stores a table of the radio channels that currently cannot be used (referred to as "unusable channel table") based on the table for frequency in use transmitted from the router 3. The host apparatus control portion 21a updates, when appropriate, all the radio channels used by the slave apparatuses 1 with which it communicates and the unusable channel table based on the table for frequency in use transmitted from the router 3.

The host apparatus control portion 21a stores one radio channel that is supposed to include the least noise as the initial channel at the time of the delivery of the cordless telephone apparatus or by setting of the user. The initial channel is used as the NOW channel at the time of establishing communications. The host apparatus control portion 21a refers to the unusable channel table, and when the initial channel matches an unusable channel listed in the unusable channel table, the host apparatus control portion 21a selects a channel to be used of the radio channels by using random numbers or the like. This selection is repeated until the initial channel does not match any of the unusable channels listed in the unusable channel table. Alternatively, a channel to be used is selected among the radio channels excluding the unusable channels with random numbers. Also when changing the radio channel that is under established communications, a channel to be used is selected among the radio channels with random numbers or the like. This selection is repeated until the initial channel does not match any of the unusable channels listed in the unusable channel table. Alternatively, a channel to be used is selected among the radio channels excluding the unusable channels with random numbers.

The slave apparatus control portion 11a stores one radio channel that is supposed to include the least noise as the initial channel at the time of the delivery of the cordless telephone apparatus or by setting of the user. The radio channel notified of by the host apparatus 2 is used when establishing communications and changing the radio channel.

Figure 14:
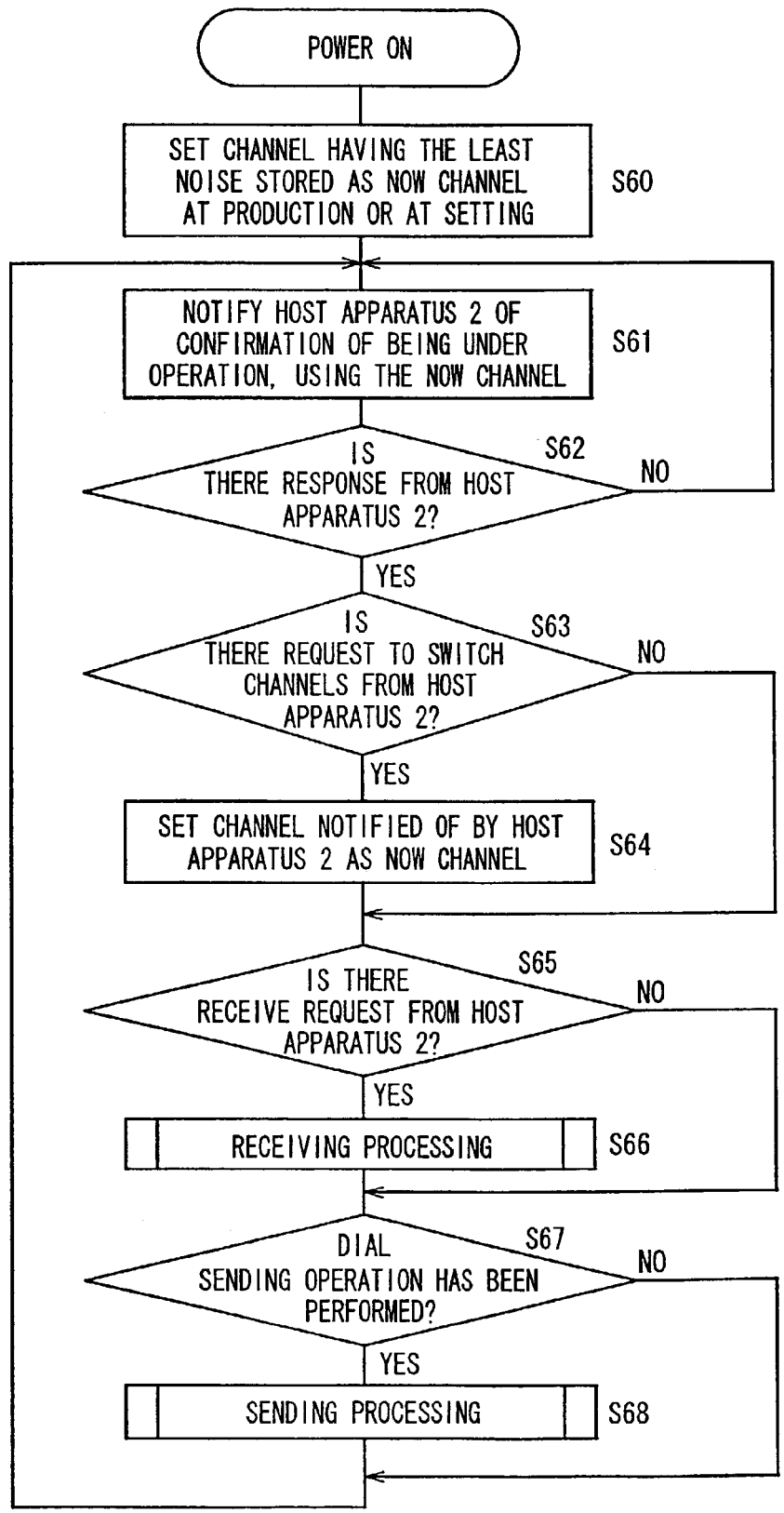
FIG. 14 is a flowchart showing processing for connecting the slave apparatus to the host apparatus of a cordless telephone apparatus of another embodiment of the invention.

FIG. 14 is a flowchart showing processing for connecting the slave apparatus 1 to the host apparatus 2 of a cordless telephone apparatus. First, when the slave apparatus 1 is turned on, the initial channel that is previously stored by the slave apparatus control portion 11a in step S60 is used as the NOW channel. In step S61, a notification for operation confirmation is transmitted from the communicating portion 15 to the host apparatus 2, using the NOW channel. In step S62, the slave apparatus control portion 11a determines whether or not there is a response from the host apparatus 2. When there is no response, the procedure goes back to step S61, and when there is a response, the procedure goes to step S63.

In step S63, the slave apparatus control portion 11a determines whether or not there is a request to switch the radio channels from the host apparatus 2. When there is a request, the procedure goes to step S64, and when there is no request, the procedure goes to step S65. In step S64, the radio channel notified of by the host apparatus 2 is used as the NOW channel. In step S65, the child portion control portion 11a determines whether or not there is a receive request from the host apparatus 2. When there is a receive request, the procedure goes to step S66, and when there is no receive request, the procedure goes to step S67.

In step S66, receiving processing is performed. In step S67, it is determined whether or not dial sending operation has been performed by the operating portion 16. When the operation has been performed, the procedure goes to step S68, and when the operation is not performed, the procedure goes back to step S60. In step S68, sending processing is performed and the procedure goes back to S60.

Figure 15:
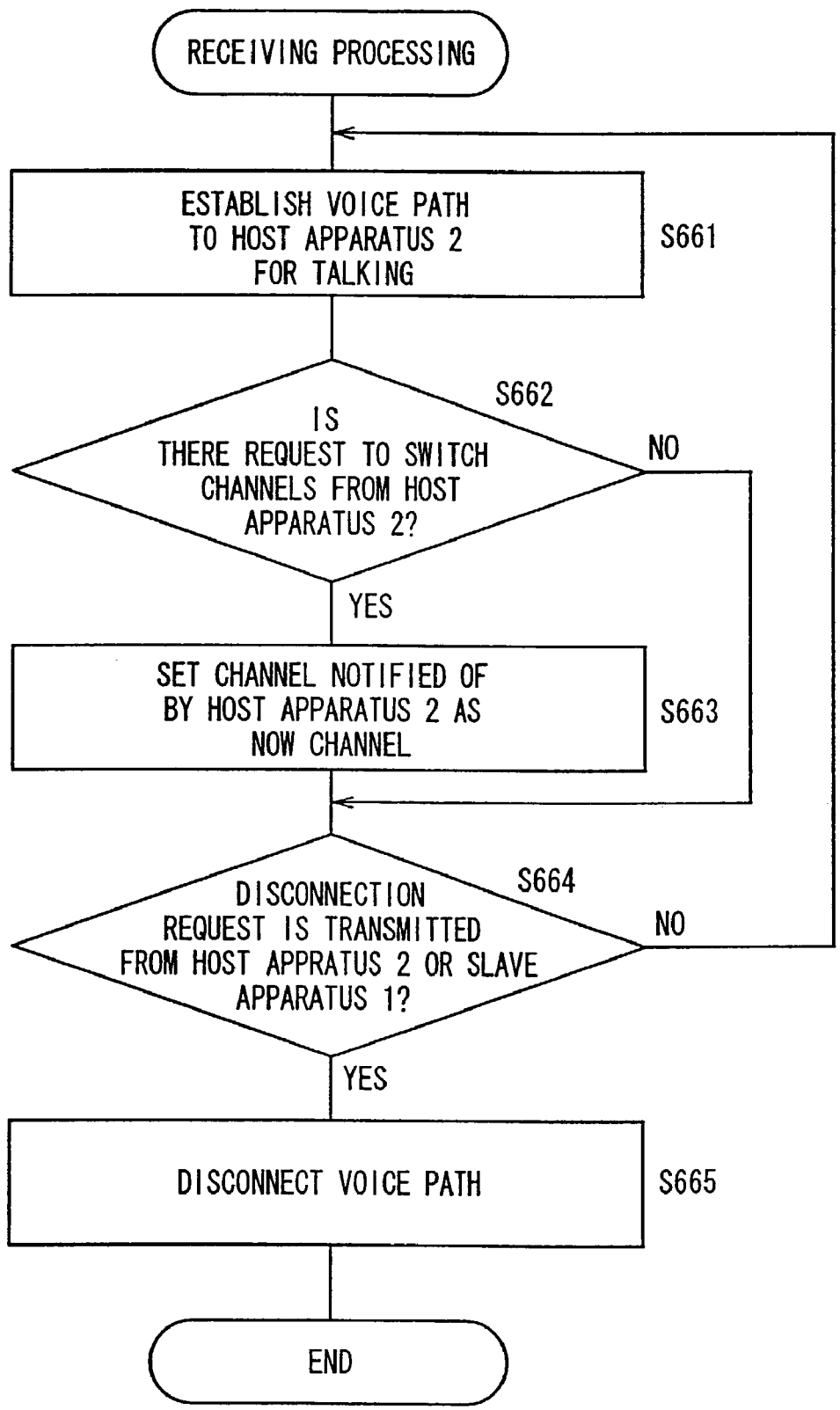
FIG. 15 is a flowchart showing the receiving processing in step S66 of FIG. 14.

FIG. 15 is a flowchart showing the receiving processing in step S66 of FIG. 14. First, in step S661, a voice path to the host apparatus 2 is established to allow talking on the telephone. In step S662, the slave apparatus control portion 11a determines whether or not there is a request to switch the radio channels from the host apparatus 2. If there is a request, the procedure goes to step S663, and when there is no request, the procedure goes back to step S664. In step S663, the radio channel notified of by the host apparatus 2 is used as the NOW channel. In step S664, it is determined whether or not there is a disconnection request from the host apparatus 2 or a disconnection operation by the operating portion 16. When there is a request or an operation, the procedure goes to step S665, and when there is no request or operation, the procedure goes back to step S661. In step S665, the voice path is disconnected.

Figure 16:
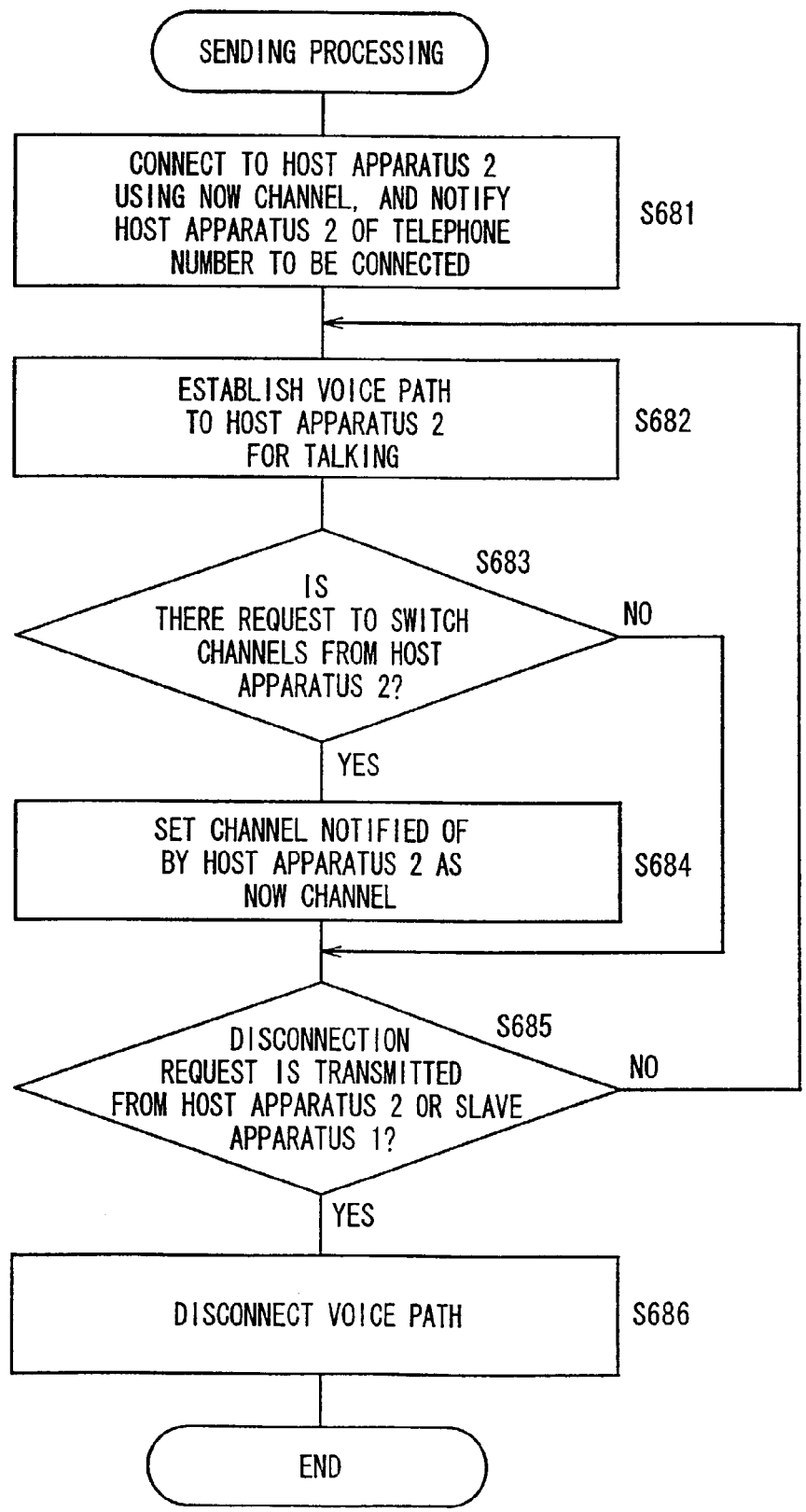
FIG. 16 is a flowchart showing the sending processing in step S68 of FIG. 14.

FIG. 16 is a flowchart showing the sending processing in step S68 of FIG. 14. First, in step S681, the host apparatus 2 is connected using the NOW channel, and the host apparatus 2 is notified of the telephone number to be connected. In step S682, a voice path to the host apparatus 2 is established to allow talking on the telephone. In step S683, the slave apparatus control portion 11a determines whether or not there is a request to switch the radio channels from the host apparatus 2. If there is a request, the procedure goes to step S684, and when there is no request, the procedure goes back to step S685. In step S684, the radio channel notified of by the host apparatus 2 is used as the NOW channel. In step S685, it is determined whether or not there is a disconnection request from the host apparatus 2 or a disconnection operation by the operating portion 16. When there is a request or an operation, the procedure goes to step S686, and when there is no request or operation, the procedure goes back to step S682. In step S686, the voice path is disconnected.

Figure 17:
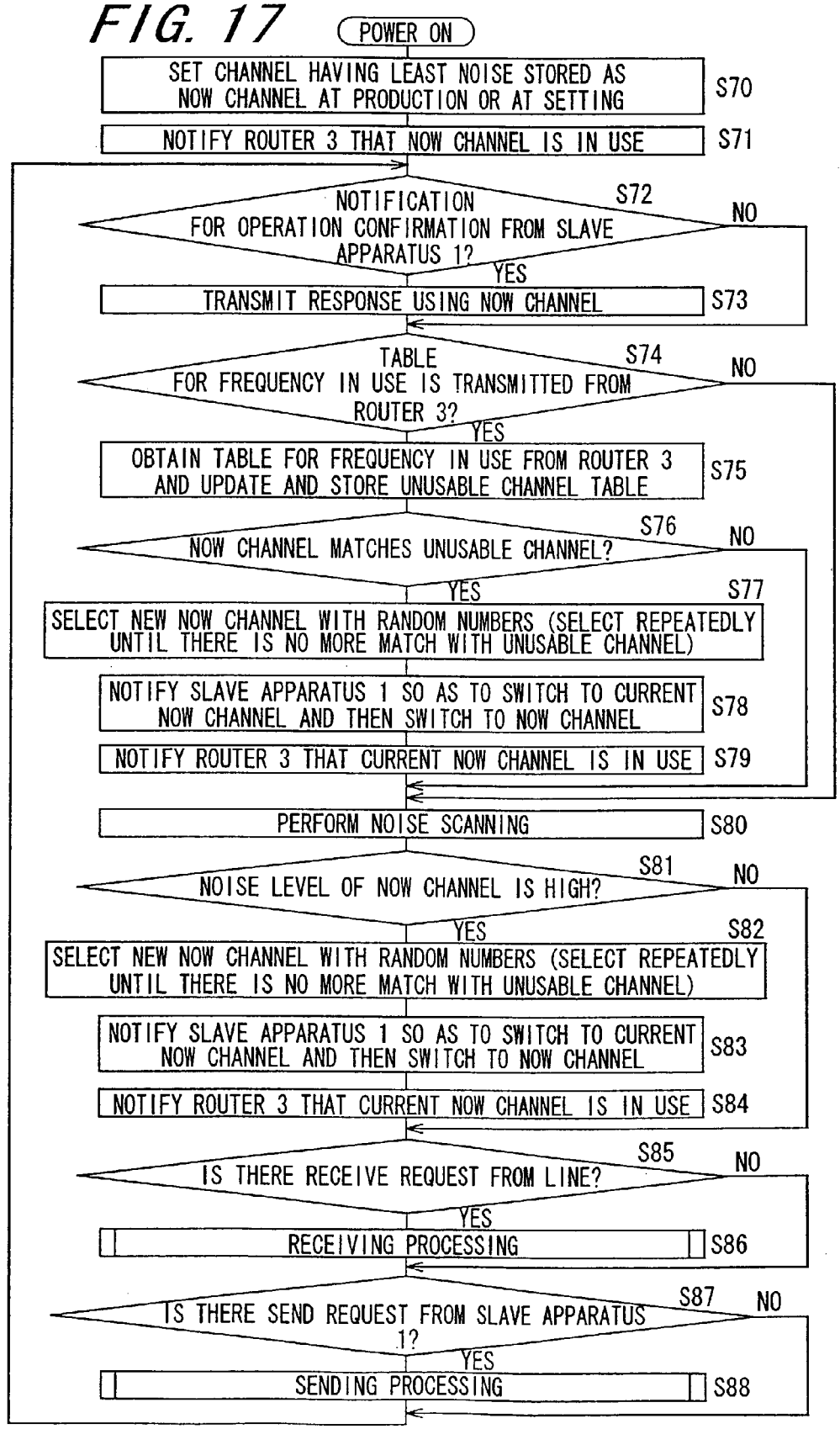
FIG. 17 is a flowchart showing processing for connecting the host apparatus to the slave apparatus of a cordless telephone apparatus of another embodiment of the invention.

FIG. 17 is a flowchart showing processing for connecting the host apparatus 2 to the slave apparatus 1 of the cordless telephone apparatus. The host apparatus 2 is connected to the router 3 via the wired inhouse network 6, and periodically acquires the frequency band used by the PCs 4 and the frequencies of noise waves generated outside the communication system 100 in the form of a table for frequency in use so as to update and store the unusable channel table.

First, the initial channel that is previously stored by the host apparatus control portion 21a in step S70 is used as the NOW channel. In step S71, the router 3 is notified that the NOW channel is a radio channel in use. In step S72, the host apparatus control portion 21*a* determines whether or not there is a notification for operation confirmation from the slave apparatus 1. When there is a notification, the procedure goes to step S73, and when there is no notification, the procedure goes to step S74. In step S73, a response is transmitted using the NOW channel.

In step S74, the host apparatus control portion 21*a* determines whether or not the table for frequency in use is transmitted from the router 3. When it is transmitted, the procedure goes to step S75, and when it is not transmitted, the procedure goes to step S80. In step S75, the unusable channel table is updated and stored based on the table for frequency in use that is notified of by the router 3. In step S76, the host apparatus control portion 21*a* compares the NOW channel with the unusable channels listed in the unusable channel table and determines whether or not there is a match. When there is a match, the procedure goes to step S77, and when there is no match, the procedure goes to step S80.

In step S77, the host apparatus control portion 21*a* selects a channel to be used among the radio channels with random numbers or the like. The selection is repeated until the selected radio channel does not match any of the unusable channels. Alternatively, a channel to be used is selected among the radio channels excluding the unusable channels with random numbers. The selected channel is used as the NOW channel. In step S78, the slave apparatus 1 is notified of a request to switch its radio channel to the selected NOW channel, and the host apparatus also switches its radio channel to the NOW channel. In step S79, the router 3 is notified that the NOW channel is a radio channel in use.

In step S80, noise scanning is performed. In step S81, it is determined whether or not the noise level is higher than the predetermined threshold value. If the noise level is higher, the procedure goes to step S82, and the noise level is lower, the procedure goes to step S85. In step S82, the host apparatus control portion 21*a* selects a channel to be used among the radio channels with random numbers or the like. The selection is repeated until the selected radio channel does not match the unusable channels. Alternatively, a channel to be used is selected among the radio channels excluding the unusable channels with random numbers. The selected channel is used as the NOW channel. In step S83, the slave apparatus 1 is notified of a request to switch its radio channel to the selected NOW channel, and the host apparatus 2 also switches its radio channel to the NOW channel. In step S84, the router 3 is notified that the NOW channel is a radio channel in use.

In step S85, it is determined whether or not there is a receive request from the public line 5, and if there is a request, the procedure goes to step S86, and if there is no request, the procedure goes to step S87. In step S86, receiving processing is performed. In step S87, it is determined whether or not there is a send request from the slave apparatus 1. When there is a request, the procedure goes to step S88, and when there is no request, the procedure goes back to step S72. In step S88, sending processing is performed, and the procedure goes back to step S72.

Figure 18:
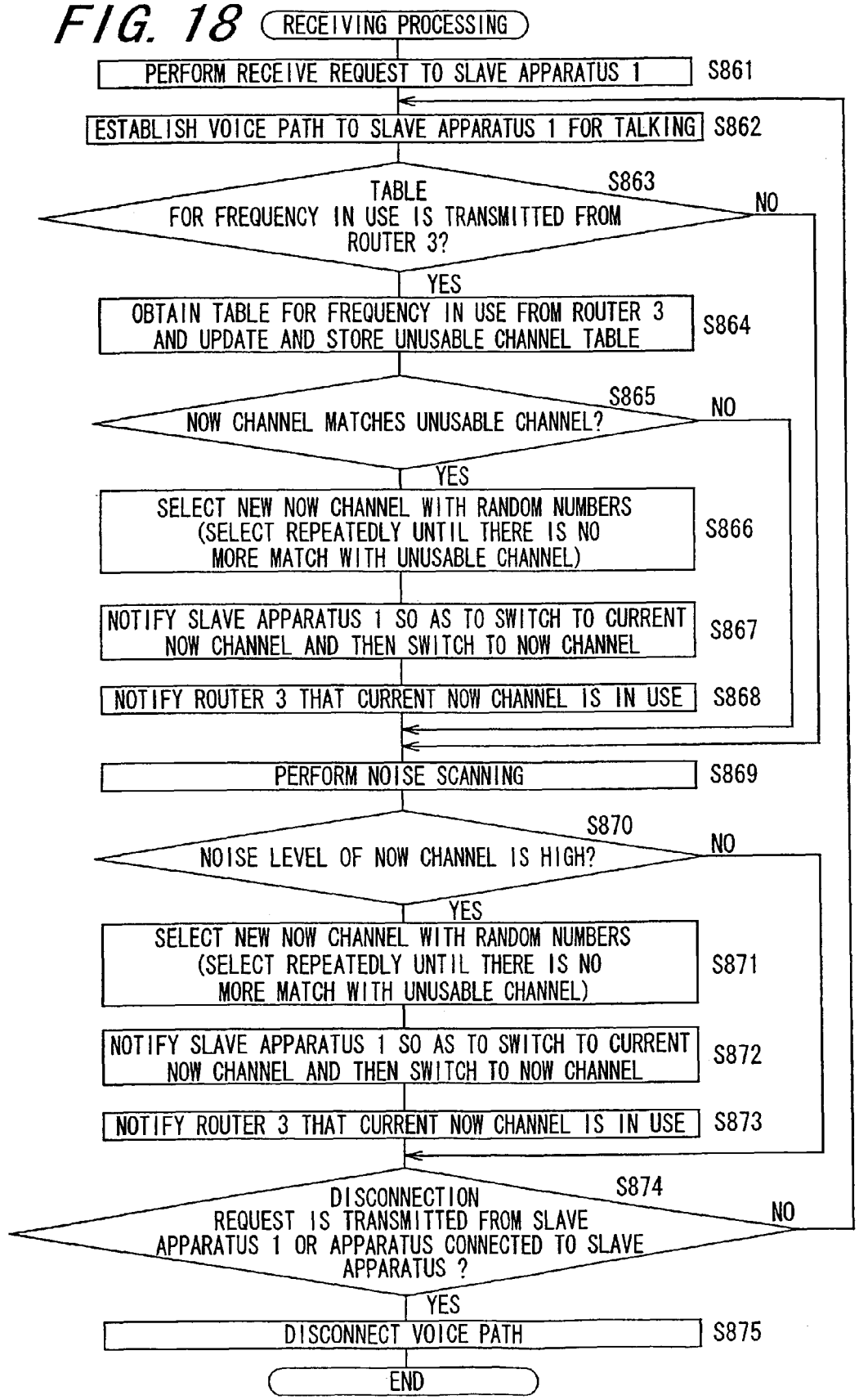
FIG. 18 is a flowchart showing the receiving processing in step S86 of FIG. 17.

FIG. 18 is a flowchart showing the receiving processing in step S86 of FIG. 17. First, in step S861, the slave apparatus 1 is notified of a receive request. In step S862, a voice path to the slave apparatus 1 is established so as to allow talking on the telephone. In step S863, the host apparatus control portion 21*a* determines whether or not the table for frequency in use is transmitted from the router 3. When it is transmitted, the procedure goes to step S864, and when it is not transmitted, the procedure goes to step S869. In step S864, the unusable channel table is updated and stored based on the table for frequency in use that is notified of by the router 3. In step S865, the NOW channel is compared with the unusable channels listed in the unusable channel table and it is determined whether or not there is a match. When there is a match, the procedure goes to step S866, and when there is no match, the procedure goes to step S869.

In step S866, the host apparatus control portion 21*a* selects a channel to be used among the radio channels with random numbers or the like. The selection is repeated until the selected radio channel does not match the unusable channels. Alternatively, a channel to be used is selected among the radio channels excluding the unusable channels with random numbers. The selected channel is used as the NOW channel. In step S867, the slave apparatus 1 is notified of a request to switch its radio channel to the selected NOW channel, and the host apparatus also switches its radio channel to the NOW channel. In step S868, the router 3 is notified that the NOW channel is a radio channel in use.

In step S869, noise scanning is performed. In step S870, it is determined whether or not the noise level is higher than the predetermined threshold value. If the noise level is higher, the procedure goes to step S871, and the noise level is lower, the procedure goes to step S874. In step S871, the host apparatus control portion 21*a* selects a channel to be used among the radio channels with random numbers or the like. The selection is repeated until the selected radio channel does not match the unusable channels. Alternatively, a channel to be used is selected among the radio channels excluding the unusable channels with random numbers. The selected channel is used as the NOW channel. In step S872, the slave apparatus 1 is notified of a request to switch its radio channel to the selected NOW channel, and the host apparatus 2 also switches its radio channel to the NOW channel. In step S873, the router 3 is notified that the NOW channel is a radio channel in use. In step S874, it is determined that there is a disconnection request from the slave apparatus 1 or the apparatus connected to the slave apparatus 1. If there is a request, the procedure goes to step S875, and if there is no request, the procedure goes back to step S862. In step S875, the voice path is disconnected.

FIG. 19 is a flowchart showing the sending processing in step S88 of FIG. 17. First, in step S881, a connection to the public line 5 is established according to a dial signal transmitted from the slave apparatus 1. In step S882, a voice path to the slave apparatus 1 is established so as to allow talking on the telephone. In step S883, the host apparatus control portion 21*a* determines whether or not the table for frequency in use is transmitted from the router 3. When it is transmitted, the procedure goes to step S884, and when it is not transmitted, the procedure goes to step S889. In step S884, the unusable channel table is updated and stored based on the table for frequency in use that is notified of by the router 3. In step S885, the host apparatus control portion 21*a* compares the NOW channel with the unusable channels listed in the unusable channel table and determines whether or not there is a match. When there is a match, the procedure goes to step S886, and when there is no match, the procedure goes to step S889.

In step S886, the host apparatus control portion 21*a* selects a channel to be used among the radio channels with random numbers or the like. The selection is repeated until the selected radio channel does not match any of the unusable channels. Alternatively, a channel to be used is selected among the radio channels excluding the unusable channels with random numbers. The selected channel is used as the NOW channel. In step S887, the slave apparatus 1 is notified of a request to switch its radio channel to the selected NOW channel, and the host apparatus also switches its radio channel to the NOW channel. In step S888, the router 3 is notified that the NOW channel is a radio channel in use.

In step S889, noise scanning is performed. In step S890, it is determined whether or not the noise level is higher than the predetermined threshold value. If the noise level is higher, the procedure goes to step S891, and the noise level is lower, the procedure goes to step S894. In step S891, the host apparatus control portion 21a selects a channel to be used among the radio channels with random numbers or the like. The selection is repeated until the selected radio channel does not match the unusable channels. Alternatively, a channel to be used is selected among the radio channels excluding the unusable channels with random numbers. The selected channel is used as the NOW channel. In step S892, the slave apparatus 1 is notified of a switching request to switch its radio channel to the selected NOW channel, and the host apparatus 2 also switches its radio channel to the NOW channel. In step S893, the router 3 is notified that the NOW channel is a radio channel in use. In step S894, it is determined whether or not there is a disconnection request from the slave apparatus 1 or the apparatus connected to the slave apparatus 1. When there is a request, the procedure goes to step S895, and when there is no request, the procedure goes back to step S882. In step S895, the voice path is disconnected.

As described above, the host apparatus 2 of a cordless telephone apparatus obtains information on the frequency used by other apparatuses from the router 3 and updates and stores an unusable channel table based on the obtained information on the frequency. Furthermore, one radio channel to be initially used is stored at the time of delivering the cordless telephone apparatus or by setting of the user. The initial channel stored at the time of establishing communications and the time of changing the radio channels is used as the NOW channel. When the NOW channel matches an unusable channel listed in the unusable channel table, a channel to be used is selected from the radio channels excluding the unusable channels by using random numbers or the like, so that the interference between the radio channels can be prevented. Thus, the communication speed and the communication speech quality of the radio communications can be improved.

Furthermore, in the above embodiments, the communication system in which the host apparatus 2 and the router 3 communicate with each other by using wires, but the host apparatus 2 and the router 3 can be integrated and the slave apparatus 1 and the router 3 having the function of the host apparatus 2 can perform radio communications with each other. In this time, the router control portion and the slave apparatus control portion act as radio communication control means, and the router control portion acts as channel detecting means. Furthermore, the communication speed and the communication speech quality of the radio communications can be improved by the noise detecting portions provided in the router and the slave apparatus acting as frequency detecting means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication system comprising:
  a communication control apparatus connected to an external network for controlling a communication path with the external network; and
  a plurality of communication terminal apparatuses that perform radio communications with the communication control apparatus, using any one of a plurality of radio channels by a communication method for communication under a predetermined protocol so as to communicate with the external network via the communication control apparatus,
  wherein the plurality of communication terminal apparatuses are grouped by each communication method under a different protocol, and
  a radio channel used in a communication method of each group overlaps a radio channel used in a communication method of at least one of the other groups,
  the communication system further comprising:
  channel detecting means for detecting a radio channel currently used by a communication terminal apparatus communicating with the communication control apparatus,
  a frequency use status memory storing a table indicating one or more frequencies being used for communication where the table has a priority order,
  radio communication control means controlling communications by selecting a radio channel other than the currently used radio channel so as not to cause interference, before interference is caused, based on the table, at least when establishing communications between a communication terminal apparatus that is not communicating and the communication control apparatus and when switching a radio channel used for communications established between the communication terminal apparatus and the communication control apparatus, and
  said radio communication control means updating the table in said frequency use status memory when the radio communication control means detects a radio channel in use, wherein
  said radio communication control means updating the table in said frequency use status memory with a radio channel or channels that are determined to be in use,
  said radio communication control means selects a radio channel from the table that is assigned a first priority in the priority order as a current channel,
  said radio communication control means updates the table when it receives information indicating at least one channel as unusable,
  said radio communication control means compares said current channel with the at least one unusable channel to determine whether the current channel matches the at least one unusable channel, and
  when said radio communication control means determines that the current channel matches the at least one unusable channel, said radio communication control means randomly selects a new channel and continues to select new channels until a new channel selected does not match the at least one unusable channel.

2. A communication system comprising:
  a communication control apparatus connected to an external network for controlling a communication path with the external network;
  a first communication terminal apparatus that performs radio communications with the communication control apparatus, using one of a plurality of radio channels by a first communication method for communication under a first protocol so as to communicate with the external network via the communication control apparatus; and
  a second communication terminal apparatus that performs radio communications with the communication control apparatus, using any one of a plurality of radio channels including a radio channel overlapping the radio channel used by the first communication method, by a second communication method for communication under a second protocol that is different from the first protocol so as to communicate with the external network via the communication control apparatus, the communication system further comprising:

channel detecting means for detecting a radio channel currently used by a communication terminal apparatus communicating with the communication control apparatus, a frequency use status memory storing a table indicating one or more frequencies being used for communication where the table has a priority order, radio communication control means controlling communications by selecting a radio channel other than the currently used radio channel so as not to cause interference, before interference is caused, based on the table, at least when establishing communications between a communication terminal apparatus that is not communicating and the communication control apparatus and when switching a radio channel used for communications established between a communication terminal apparatus and the communication control apparatus, and said radio communication control means updating the table in said frequency use status memory when the radio communication control means detects a radio channel in use, wherein said radio communication control means updating the table in said frequency use status memory with a radio channel or channels that are determined to be in use, said radio communication control means selects a radio channel from the table that is assigned a first priority in the priority order as a current channel, said radio communication control means updates the table when it receives information indicating at least one channel as unusable, said radio communication control means compares said current channel with the at least one unusable channel to determine whether the current channel matches the at least one unusable channel, and when said radio communication control means determines that the current channel matches the at least one unusable channel, said radio communication control means randomly selects a new channel and continues to select new channels until a new channel selected does not match the at least one unusable channel.

3. The communication system of claim 2, wherein the frequency band of the radio channel used in the first communication method is different from the frequency band of the radio channel used in the second communication method.

4. The communication system of claim 1, wherein the channel detecting means is provided in the communication control apparatus.

5. The communication system of claim 2, wherein the channel detecting means is provided in the communication control apparatus.

6. The communication system of claim 1, wherein the radio communication control means is provided in at least one of the communication control apparatus and the communication terminal apparatus.

7. The communication system of claim 2, wherein the radio communication control means is provided in at least one of the communication control apparatus and the communication terminal apparatus.

8. The communication system of claim 1, further comprising frequency detecting means for detecting the frequency of received radio waves, wherein the radio communication control means sets a radio channel including the frequency detected by the frequency detecting means to be the currently used radio channel.

9. The communication system of claim 2, further comprising frequency detecting means for detecting the frequency of received radio waves, wherein the radio communication control means sets a radio channel including the frequency detected by the frequency detecting means to be the currently used radio channel.

10. The communication system of claim 8, wherein the frequency detecting means is provided in at least one of the communication control apparatus and the communication terminal apparatus.

11. The communication system of claim 9, wherein the frequency detecting means is provided in at least one of the communication control apparatus and the communication terminal apparatus.

12. A communication control apparatus included in a communication system comprising the communication control apparatus connected to an external network for controlling a communication path with the external network; and a plurality of communication terminal apparatuses that perform radio communications with the communication control apparatus, using either one of a plurality of radio channels by a communication method for communication under a predetermined protocol so as to communicate with the external network via the communication control apparatus, wherein the plurality of communication terminal apparatuses are grouped by each communication method under a different protocol, and a radio channel used in a communication method of each group overlaps a radio channel used in a communication method of at least one of the other groups, the communication control apparatus comprising:

channel detecting means for detecting a radio channel currently used by a communication terminal apparatus communicating with the communication control apparatus;

a frequency use status memory storing a table indicating one or more frequencies being used for communication where the table has a priority order;

radio communication control means controlling communications by selecting a radio channel other than the currently used radio channel so as not to cause interference, before interference is caused, based on the table, at least when establishing communications between a communication terminal apparatus that is not communicating and the communication control apparatus and when switching a radio channel used for communications established between a communication terminal apparatus and the communication control apparatus; and said radio communication control means updating the table in said frequency use status memory when the radio communication control means detects a radio channel in use, wherein said radio communication control means updating the table in said frequency use status memory with a radio channel or channels that are determined to be in use, said radio communication control means selects a radio channel from the table that is assigned a first priority in the priority order as a current channel, said radio communication control means updates the table when it receives information indicating at least one channel as unusable, said radio communication control means compares said current channel with the at least one unusable channel to determine whether the current channel matches the at least one unusable channel, and when said radio communication control means determines that the current channel matches the at least one unusable channel, said radio communication control means randomly selects a new channel and continues to select new channels until a new channel selected does not match the at least one unusable channel.

13. The communication control apparatus of claim 12, further comprising frequency detecting means for detecting the frequency of received radio waves, wherein the radio communication control means sets a radio channel including the frequency detected by the frequency detecting means to be the currently used radio channel.

14. A communication terminal apparatus included in a communication system comprising a communication control apparatus connected to an external network for controlling a communication path with the external network; and a plurality of communication terminal apparatuses that perform radio communications with the communication control apparatus, using either one of a plurality of radio channels by a communication method for communication under a predetermined protocol so as to communicate with the external network via the communication control apparatus, wherein the plurality of communication terminal apparatuses are grouped by each communication method under a different protocol, and a radio channel used in a communication method of each group overlaps a radio channel used in a communication method of at least one of the other groups, the communication terminal apparatus comprising:

channel detecting means for detecting a radio channel currently used by a communication terminal apparatus communicating with the communication control apparatus;

a frequency use status memory storing a table indicating one or more frequencies being used for communication where the table has a priority order;

radio communication control means controlling communications by selecting a radio channel other than the currently used radio channel so as not to cause interference, before interference is caused, based on the table, at least when establishing communications between a communication terminal apparatus that is not communicating and the communication control apparatus and when switching a radio channel used for communications established between a communication terminal apparatus and the communication control apparatus; and said radio communication control means updating the table in said frequency use status memory when the radio communication control means detects a radio channel in use, wherein said radio communication control means updating the table in said frequency use status memory with a radio channel or channels that are determined to be in use, said radio communication control means selects a radio channel from the table that is assigned a first priority in the priority order as a current channel, said radio communication control means updates the table when it receives information indicating at least one channel as unusable, said radio communication control means compares said current channel with the at least one unusable channel to determine whether the current channel matches the at least one unusable channel, and when said radio communication control means determines that the current channel matches the at least one unusable channel, said radio communication control means randomly selects a new channel and continues to select new channels until a new channel selected does not match the at least one unusable channel.

15. The communication terminal apparatus of claim 14, further comprising frequency detecting means for detecting the frequency of received radio waves, wherein the radio communication control means sets a radio channel including the frequency detected by the frequency detecting means to be the currently used radio channel.

16. A communication system comprising:

a router connected to an external network for controlling a communication path with the external network;

a communication terminal apparatus that performs radio communications with the router, using one of a plurality of radio channels by a first communication method for communication under a first protocol so as to communicate with the external network via the router;

a host apparatus that performs wired communications with the router and communicates with the external network via the router;

a slave apparatus that performs radio communications with the host apparatus, using one of a plurality of radio channels including a radio channel overlapping the radio channel used by the first communication method, by a second communication method for communication under a second protocol that is different from the first protocol and communicates with the external network via the host apparatus and the router;

channel detecting means for detecting a radio channel currently used by a communication terminal apparatus communicating with the router and a radio channel currently used by the slave apparatus communicating with the host apparatus;

a frequency use status memory storing a table indicating one or more frequencies being used for communication where the table has a priority order;

radio communication control means controlling communications by selecting a radio channel other than the currently used radio channel so as not to cause interference, before interference is caused, based on the table, at least when establishing communications between a communication terminal apparatus that is not communicating and the router or communications between the host apparatus and the slave apparatus and when switching a radio channel used for communications established between a communication terminal apparatus and the router or communications established between the host apparatus and the slave apparatus; and said radio communication control means updating the table in said frequency use status memory when the radio communication control means detects a radio channel in use, wherein said radio communication control means updating the table in said frequency use status memory with a radio channel or channels that are determined to be in use, said radio communication control means selects a radio channel from the table that is assigned a first priority in the priority order as a current channel, said radio communication control means updates the table when it receives information indicating at least one channel as unusable, said radio communication control means compares said current channel with the at least one unusable channel to determine whether the current channel matches the at least one unusable channel, and when said radio communication control means determines that the current channel matches the at least one unusable channel, said radio communication control means randomly selects a new channel and continues to select new channels until a new channel selected does not match the at least one unusable channel.

17. A communication system comprising:

a communication control apparatus connected to an external network for controlling a communication path with the external network; and a plurality of communication terminal apparatuses that perform radio communications with the communication control apparatus, using any one of a plurality of radio channels by a communication method for communication under a predetermined protocol so as to communicate with the external network via the communication control apparatus, wherein the plurality of communication terminal apparatuses are grouped by each communication method under a different protocol, and a radio channel used in a communication method of each group overlaps a radio channel used in a communication method of at least one of the other groups, the communication system further comprising:

a channel detector for detecting a radio channel currently used by a communication terminal apparatus communicating with the communication control apparatus;

a frequency use status memory storing a table indicating one or more frequencies being used for communication where the table has a priority order;

a radio communication controller controlling communications by selecting a radio channel other than the currently used radio channel so as not to cause interference, before interference is caused, based on the table, at least when establishing communications between a communication terminal apparatus that is not communicating and the communication control apparatus and when switching a radio channel used for communications established between the communication terminal apparatus and the communication control apparatus; and said radio communication controller updating the table in said frequency use status memory when the radio communication controller detects a radio channel in use, wherein said radio communication controller updating the table in said frequency use status memory with a radio channel or channels that are determined to be in use, said radio communication controller selects a radio channel from the table that is assigned a first priority in the priority order as a current channel, said radio communication controller updates the table when it receives information indicating at least one channel as unusable, said radio communication controller compares said current channel with the at least one unusable channel to determine whether the current channel matches the at least one unusable channel, and when said radio communication controller determines that the current channel matches the at least one unusable channel, said radio communication controller randomly selects a new channel and continues to select new channels until a new channel selected does not match the at least one unusable channel.

18. A communication system comprising:

a communication control apparatus connected to an external network for controlling a communication path with the external network;

a first communication terminal apparatus that performs radio communications with the communication control apparatus, using one of a plurality of radio channels by a first communication method for communication under a first protocol so as to communicate with the external network via the communication control apparatus; and a second communication terminal apparatus that performs radio communications with the communication control apparatus, using any one of a plurality of radio channels including a radio channel overlapping the radio channel used by the first communication method, by a second communication method for communication under a second protocol that is different from the first protocol so as to communicate with the external network via the communication control apparatus, the communication system further comprising:

a channel detector for detecting a radio channel currently used by a communication terminal apparatus communicating with the communication control apparatus;

a frequency use status memory storing a table indicating one or more frequencies being used for communication where the table has a priority order;

a radio communication controller controlling communications by selecting a radio channel other than the currently used radio channel so as not to cause interference, before interference is caused, based on the table, at least when establishing communications between a communication terminal apparatus that is not communicating and the communication control apparatus and when switching a radio channel used for communications established between a communication terminal apparatus and the communication control apparatus; and said radio communication controller updating the table in said frequency use status memory when the radio communication controller detects a radio channel in use, wherein said radio communication controller updating the table in said frequency use status memory with a radio channel or channels that are determined to be in use, said radio communication controller selects a radio channel from the table that is assigned a first priority in the priority order as a current channel, said radio communication controller updates the table when it receives information indicating at least one channel as unusable, said radio communication controller compares said current channel with the at least one unusable channel to determine whether the current channel matches the at least one unusable channel, and when said radio communication controller determines that the current channel matches the at least one unusable channel, said radio communication controller randomly selects a new channel and continues to select new channels until a new channel selected does not match the at least one unusable channel.

19. The communication system of claim 1, wherein the radio communication control means transmits the table in response to a request from a first communication terminal apparatus.

20. The communication system of claim 19, wherein the first communication terminal apparatus comprising
a priority channel memory storing a priority channel table with a priority order determined by an amount of noise for each channel.

21. The communication system of claim 20, wherein the first communication terminal apparatus further comprising
a first communication terminal controller, wherein the first communication terminal controller updates the priority channel table based on the table transmitted by the radio communication control means.

22. A communication terminal apparatus comprising:
a channel detector detecting a radio channel currently used by the communication terminal apparatus communicating with a communication control apparatus;
a frequency use status memory storing a table indicating one or more frequencies being used for communication where the table has a priority order; and
a controller controlling communications by selecting a radio channel other than the currently used radio channel so as not to cause interference, before interference is caused, based on the table, at least when establishing communications between a communication terminal apparatus that is not communicating and the communication control apparatus and when switching a radio channel used for communications established between a communication terminal apparatus and the communication control apparatus, and
said controller updating the table in said frequency use status memory when the controller detects a radio channel in use, wherein
said controller updating the table in said frequency use status memory when the controller detects a radio channel in use,
said controller updating the table in said frequency use status memory with a radio channel or channels that are determined to be in use,
said controller selects a radio channel from the table that is assigned a first priority in the priority order as a current channel,
said controller updates the table when it receives information indicating at least one channel as unusable,
said controller compares said current channel with the at least one unusable channel to determine whether the current channel matches the at least one unusable channel, and
when said controller determines that the current channel matches the at least one unusable channel, said controller randomly selects a new channel and continues to select new channels until a new channel selected does not match the at least one unusable channel.

23. A communication method comprising:
detecting a radio channel currently used by a communication terminal apparatus communicating with a communication control apparatus;
storing a table indicating one or more frequencies being used for communication where the table has a priority order;
controlling communications by selecting a radio channel other than the currently used radio channel so as not to cause interference, before interference is caused, based on the table, at least when establishing communications between a communication terminal apparatus that is not communicating and the communication control apparatus and when switching a radio channel used for communications established between the communication terminal apparatus and the communication control apparatus;
updating the table when a radio channel in use is detected;
updating the table in said frequency use status memory with a radio channel or channels that are determined to be in use;
selecting a radio channel from the table that is assigned a first priority in the priority order as a current channel;
updating the table when information is received indicating at least one channel as unusable; and
comparing said current channel with the at least one unusable channel to determine whether the current channel matches the at least one unusable channel, wherein
when the current channel is determined to match the at least one unusable channel, randomly selecting a new channel and continuing to select new channels until a new channel selected does not match the at least one unusable channel.

* * * * *